United States Patent
Matsuoka et al.

(10) Patent No.: US 12,442,509 B2
(45) Date of Patent: Oct. 14, 2025

(54) LIGHT-EMITTING MODULE WITH COVER MEMBER AND LIGHT-TRANSMISSIVE MEMBER HAVING HIGHER HARDNESS THAN COVER MEMBER

(71) Applicant: NICHIA CORPORATION, Anan (JP)

(72) Inventors: Shinya Matsuoka, Anan (JP); Tsuyoshi Okahisa, Tsukushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/883,561

(22) Filed: Sep. 12, 2024

(65) Prior Publication Data

US 2025/0093012 A1    Mar. 20, 2025

(30) Foreign Application Priority Data

Sep. 20, 2023  (JP) ................................. 2023-153914
Apr. 2, 2024   (JP) ................................. 2024-059440

(51) Int. Cl.
| | |
|---|---|
| F21V 3/10 | (2018.01) |
| F21V 3/04 | (2018.01) |
| F21V 5/04 | (2006.01) |
| F21Y 105/16 | (2016.01) |
| F21Y 115/10 | (2016.01) |
| F21Y 115/30 | (2016.01) |

(52) U.S. Cl.
CPC ................ F21V 3/10 (2018.02); F21V 3/049 (2013.01); F21V 5/048 (2013.01); *F21Y 2105/16* (2016.08); *F21Y 2115/10* (2016.08); *F21Y 2115/30* (2016.08)

(58) Field of Classification Search
CPC . F21V 3/10; F21V 3/049; F21V 5/002; F21V 5/008; F21V 5/048; F21K 9/66; F21K 9/69
See application file for complete search history.

(56) References Cited

U.S. PATENT DOCUMENTS

| | | | |
|---|---|---|---|
| 6,404,797 B1 * | 6/2002 | Mooradian | H01S 5/04256 |
| | | | 348/E9.027 |
| 8,749,796 B2 * | 6/2014 | Pesach | G01B 11/2513 |
| | | | 356/610 |
| 9,048,633 B2 * | 6/2015 | Gronenborn | H01S 5/423 |

(Continued)

FOREIGN PATENT DOCUMENTS

| | | |
|---|---|---|
| JP | 2012-064367 A | 3/2012 |
| JP | 2018-120113 A | 8/2018 |

(Continued)

*Primary Examiner* — Ismael Negron
(74) *Attorney, Agent, or Firm* — Foley & Lardner LLP

(57) ABSTRACT

A light-emitting module includes: a light source; a lens located over the light source and configured to transmit light from the light source; and a cover member located over the lens and having a lower surface on which the light is to be incident and an upper surface from which the light is to be emitted, where the lower surface of the cover member includes: a first region on which the light from the light source after being transmitted through the lens is to be incident, and a second region located around the first region, a light diffusivity of the second region being higher than a light diffusivity of the first region; and a light-transmissive member covering the upper surface of the cover member and having a higher hardness than a hardness of the cover member.

21 Claims, 13 Drawing Sheets

(56) References Cited

U.S. PATENT DOCUMENTS

| | | | |
|---|---|---|---|
| 9,534,772 B2 * | 1/2017 | Lowenthal | H01L 24/95 |
| 11,231,149 B2 * | 1/2022 | Okahisa | G02B 1/14 |
| 11,575,073 B2 * | 2/2023 | Okahisa | H10H 20/855 |
| 12,152,771 B1 * | 11/2024 | Cheng | F21V 9/30 |
| 2006/0002114 A1 * | 1/2006 | Sun | F21V 5/04 |
| | | | 348/E5.029 |
| 2008/0198604 A1 * | 8/2008 | Kim | F21V 7/0091 |
| | | | 362/293 |
| 2010/0328958 A1 * | 12/2010 | Zhang | G02B 19/0061 |
| | | | 362/311.02 |
| 2011/0280023 A1 * | 11/2011 | Lee | F21V 5/04 |
| | | | 362/326 |
| 2013/0223064 A1 * | 8/2013 | Lee | F21K 9/00 |
| | | | 362/235 |
| 2019/0369370 A1 | 12/2019 | Yamamoto | |
| 2021/0071837 A1 * | 3/2021 | Owoc | F21V 23/0442 |
| 2021/0091271 A1 | 3/2021 | Okahisa et al. | |

FOREIGN PATENT DOCUMENTS

| | | |
|---|---|---|
| JP | 2021-048318 A | 3/2021 |
| JP | 2021-153011 A | 9/2021 |
| WO | WO-2015/125557 A1 | 8/2015 |

* cited by examiner

LIGHT-EMITTING MODULE WITH COVER MEMBER AND LIGHT-TRANSMISSIVE MEMBER HAVING HIGHER HARDNESS THAN COVER MEMBER

CROSS-REFERENCE TO RELATED APPLICATIONS

The present application claims priority under 35 U.S.C. § 119 to Japanese Patent Application No. 2023-153914, filed Sep. 20, 2023, and Japanese Patent Application No. 2024-059440, filed Apr. 2, 2024. The entire contents of these applications are hereby incorporated by reference.

BACKGROUND

1. Technical Field

The present disclosure relates to a light-emitting module and a cover structure.

2. Description of Related Art

Light-emitting modules including light-emitting elements such as light-emitting diodes (LEDs) have been widely used. As such a light-emitting module, for example, International Patent Publication No. 2015/125557 describes a configuration in which a light source unit, a lens, and a cover member are included, and a diffusion portion configured with a plurality of parallel grooves is formed in a portion of the cover member.

SUMMARY

A light-emitting module is required to reduce stray light on an irradiation surface.

It is an object of one embodiment of the present disclosure to provide a light-emitting module and a cover structure that reduce stray light on an irradiation surface.

A light-emitting module according to one embodiment of the present disclosure includes a light source; a lens disposed over the light source and configured to transmit light from the light source; and a cover member disposed over the lens, and having a lower surface on which the light is to be incident and an upper surface from which the light is to be emitted. The lower surface of the cover member includes a first region on which the light from the light source after being transmitted through the lens is to be incident, and a second region provided around the first region and having a higher light diffusivity than a light diffusivity of the first region. The upper surface of the cover member is covered by a light-transmissive member having a higher hardness than a hardness of the cover member.

A cover structure according to one embodiment of the present disclosure includes a lens; and a cover member disposed over the lens and having a lower surface and an upper surface. The lower surface of the cover member includes a first region, and a second region provided around the first region and having a higher light diffusivity than a light diffusivity of the first region. The upper surface of the cover member is covered by a light-transmissive member having a higher hardness than a hardness of the cover member.

BRIEF DESCRIPTION OF THE DRAWINGS

A more complete appreciation of embodiments of the invention and many of the attendant advantages thereof will be readily obtained by reference to the following detailed description when considered in connection with the accompanying drawings.

DETAILED DESCRIPTION

Figure 1:
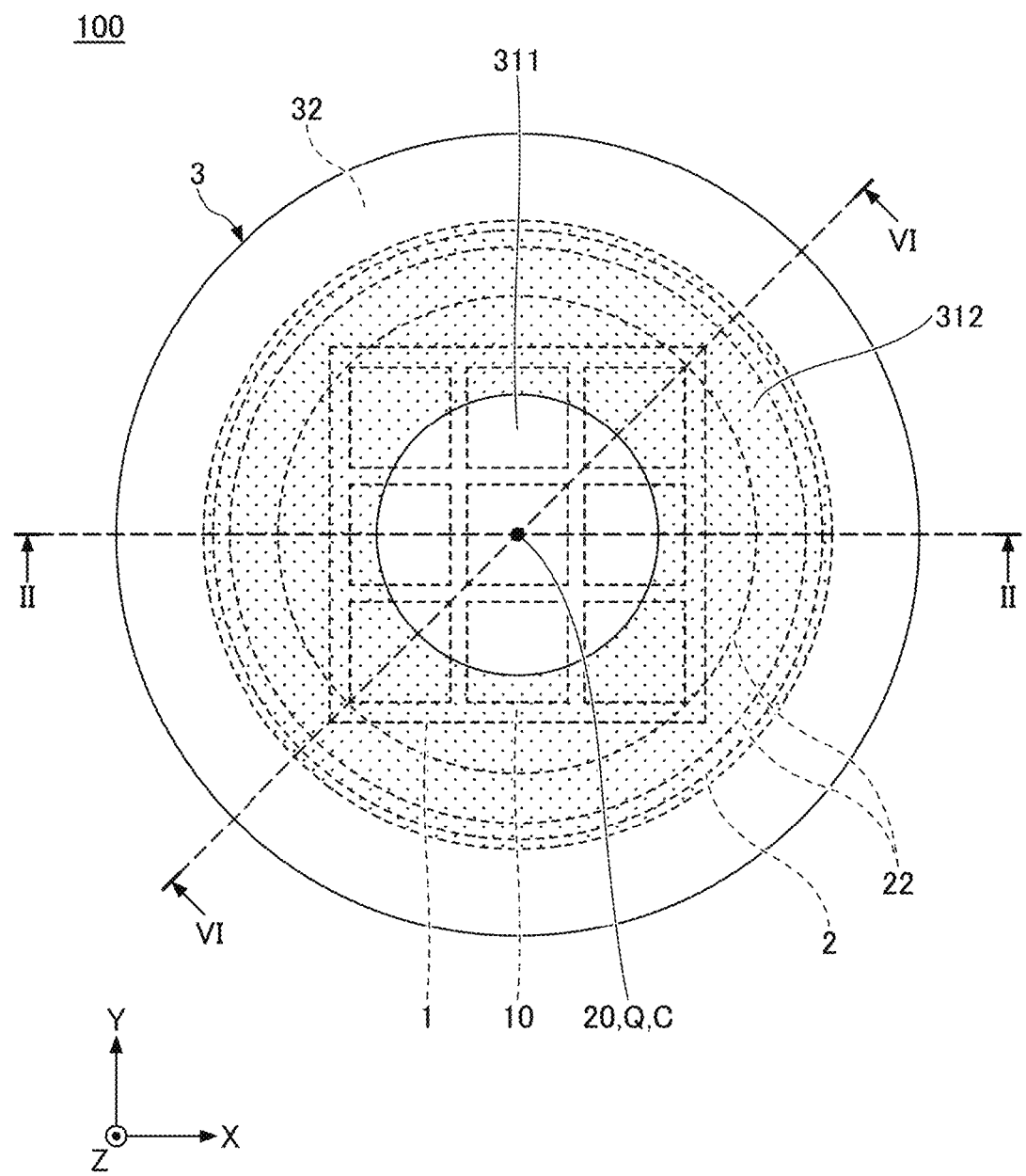
FIG. 1 is a schematic top view illustrating an example of a light-emitting module according to a first embodiment.

Light-emitting modules and cover structures according to embodiments of the present disclosure will be described in detail with reference to the accompanying drawings. The embodiments described below are provided as examples of light-emitting modules and the cover structures that embody the technical ideas of the invention, but the invention is not limited to the described embodiments. In addition, unless otherwise specified, the dimensions, materials, shapes, relative arrangements, and the like of components described in the embodiments are not intended to limit the scope of the present invention thereto, but are described as examples. The sizes, positional relationships, and the like of members illustrated in the drawings may be exaggerated for clearer illustration. Further, in the following description, the same names and reference numerals refer to the same or similar members, and a detailed description thereof will be omitted as appropriate. An end view illustrating only a cut surface may be used as a cross-sectional view.

In the drawings, directions may be indicated by an X-axis, a Y-axis, and a Z-axis. The X-axis, the Y-axis, and the Z-axis are orthogonal to one another. An X direction along the X-axis and a Y direction along the Y-axis indicate directions along a light-emitting surface of a light-emitting part included in each of the light-emitting modules according to the embodiments. A Z direction along the Z-axis indicates a direction orthogonal to the light-emitting surface. That is, the light-emitting surface of the light-emitting part is parallel to the XY plane, and the Z-axis is orthogonal to the XY plane.

A direction indicated by an arrow in the X direction is referred to as a +X side, and a direction opposite to the +X side is referred to as a −X side. A direction indicated by an arrow in the Y direction is referred to as a +Y side, and a direction opposite to the +Y side is referred to as a −Y side. A direction indicated by an arrow in the Z direction is referred to as a +Z side, and a direction opposite to the +Z side is referred to as a −Z side. In the embodiments, the light-emitting part included in each of the light-emitting modules are configured to emit light to the +Z side as an example. Further, the phrase "in a top view" as used in the embodiments refers to viewing an object from the +Z side. However, these expressions do not limit the orientations of the light-emitting modules according to the embodiments during use, and the orientations of the light-emitting modules according to the embodiments are arbitrary.

Further, in the present specification, a surface of the object as viewed from the +Z side is referred to as an "upper surface," and a surface of the object as viewed from the −Z side is referred to as a "lower surface." In the embodiments described below, each of "along the X-axis," "along the Y-axis," and "along the Z-axis" includes a case where the object is at an inclination within a range of ±10° with respect to the corresponding one of the axes. Further, in the embodiments, the term "orthogonal" may include a deviation within ±10° of 90°.

In the present specification and the claims, if there are multiple components and these components are to be distinguished from one another, the components may be distinguished by adding terms "first," "second," and the like before the names of the components. Further, objects to be distinguished may be different between the specification and the claims. Therefore, even if a component recited in the claims is denoted by the same reference numeral as that of a component described in the present specification, an object specified by the component recited in the claims is not necessarily identical with an object specified by the component described in the specification.

For example, if components are distinguished by the ordinal numbers "first," "second," and "third" in the specification, and components with "first" and "third" or components with "first" and without a specific ordinal number in the specification are described in the claims, these components may be distinguished by the ordinal numbers "first" and "second" in the claims for ease of understanding. In this case, the components with "first" and "second" in the claims respectively refer to the components with "first" and "third" or the components with "first" and without a specific ordinal number in the specification. This rule is applied not only to components but also other objects in a reasonable and flexible manner.

First Embodiment

Example Configuration of Light-Emitting Module According to First Embodiment

Figure 2:
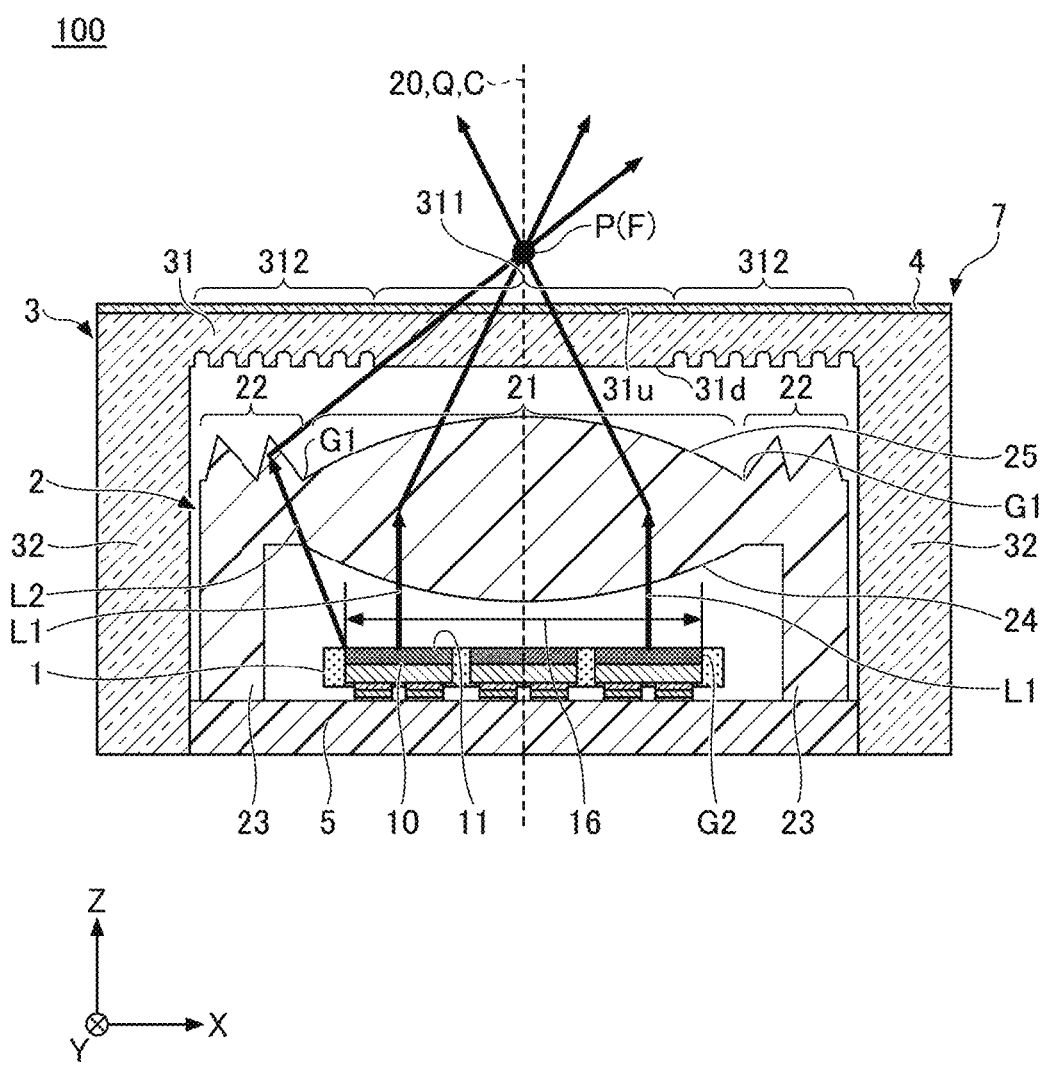
FIG. 2 is a schematic cross-sectional view taken through line II-II of FIG. 1.

A configuration of a light-emitting module 100 according to a first embodiment will be described with reference to FIG. 1 and FIG. 2. FIG. 1 is a schematic top view illustrating an example of the light-emitting module 100 according to the first embodiment. FIG. 2 is a schematic cross-sectional view taken through line II-II of FIG. 1. As an example, the light-emitting module 100 is a light-emitting module installed in a smartphone and used for a flash of an imaging device provided in the smartphone. The imaging device includes a camera for capturing a still image, a video camera for capturing a moving image, and the like.

The light-emitting module 100 includes a light source 1, a lens 2 disposed over the light source 1 and configured to transmit light L from the light source 1, and a cover member 3 disposed over the lens 2 and having a lower surface 31d on which the light L is to be incident and an upper surface 31u from which the light L is to be emitted. The lower surface 31d of the cover member 3 includes a first region 311 in which the light L from the light source 1 after being transmitted through the lens 2 is to be incident, and a second region 312 provided around the first region 311 and having a higher light diffusivity than that of the first region 311. The upper surface 31u of the cover member 3 is covered by a light-transmissive member 4 having a higher hardness than that of the cover member 3.

In the example illustrated in FIG. 2, the lower surface 31d of the cover member 3 in the second region 312 is a rough surface, and thus the second region 312 has a higher light diffusivity than that of the first region 311.

Light L2 passing through the outside of an effective outer edge G1 of an effective portion 21 of the lens 2, of the light L emitted from the light source 1 and transmitted through the lens 2, is diffused by the second region 312 of the cover member 3. Accordingly, in the present embodiment, stray light that is likely to be generated due to the light L2 having passed through the outside of the effective outer edge G1 of the effective portion 21 can be reduced. Therefore, the light-emitting module 100 that reduces stray light on an irradiation surface can be provided.

Further, in the light-emitting module 100, the upper surface 31u of the cover member 3 is covered by the light-transmissive member 4 having a higher hardness than that of the cover member 3. Therefore, for example, in a case where the light-emitting module 100 is installed in a smartphone and the upper surface 31u of the cover member 3 is exposed through a housing of the smartphone, the upper surface 31u of the cover member 3 can be prevented from being damaged, and also chemical resistance and the like of the upper surface 31u of the cover member 3 can be improved.

In the example illustrated in FIG. 1 and FIG. 2, the shape of the light-emitting module 100 in a top view is a substantially circular shape. However, the shape of the light-emitting module 100 in a top view can be a substantially rectangular shape, a substantially elliptical shape, a substantially polygonal shape, or the like.

A wiring substrate 5 is a plate-shaped member having a substantially circular shape in a top view. The wiring substrate 5 is a substrate including wiring on which the light source 1 and various electronic components can be mounted. The shape of the wiring substrate 5 in a top view can be a substantially rectangular shape, a substantially elliptical shape, a substantially polygonal shape, or the like.

The light source 1 is disposed on the upper surface (the surface on the +Z side) of the wiring substrate 5. The light source 1 includes a light-emitting region 16 including at least one light-emitting surface 11. In the example illustrated in FIG. 1 and FIG. 2, the light source 1 includes nine light-emitting parts 10 having respective light-emitting surfaces 11. A region including the light-emitting surfaces 11 corresponds to the light-emitting region 16. If there is only one light-emitting surface 11, the light-emitting region 16 is a region surrounded by an outer edge G2 of the light-emitting surface 1. If the light source 1 includes a plurality of light-emitting surfaces 11, the light-emitting region 16 is a region formed by connecting outer edges G2 of light emitting surfaces 11 located outward in a top view. The light source 1 emits the light L toward the lens 2 from light-emitting surfaces 11 included in a plurality of respective light-emitting parts 10. The number of the light-emitting parts 10 included in the light source 1 is not limited to nine, and can be at least one.

The light-emitting module 100 can turn on the plurality of light-emitting parts 10 individually or in groups. The light-emitting module 100 can increase the contrast on the irradiation surface irradiated with the light L from the light source 1 by individually turning on the plurality of light-emitting parts 10 with desired brightness or turning on the plurality of light-emitting parts 10 in groups. Further, the light-emitting module 100 can perform partial irradiation on the illumination surface by individually turning on the plurality of light-emitting parts 10 or turning on the plurality of light-emitting parts 10 in groups. The "partial irradiation" means that a partial region of the irradiation surface is irradiated with light.

In the partial irradiation, a partial region of the irradiation surface is irradiated with light. Therefore, the outer edge of irradiation light is preferably clear such that light with which a desired region is irradiated is made conspicuous. That is, it is preferable to have a large difference in illuminance of irradiation light between a desired region to be irradiated with light and a region other than the desired region. In other words, it is preferable that the amount of stray light around irradiation light is small in a desired region of the irradiation surface to be irradiated with light. By reducing the amount of stray light on the irradiation surface, the light-emitting module 100 can reduce the amount of light with which a region other than a desired region is irradiated, while irradiating the desired region with light L. Accordingly, a difference in illuminance of irradiation light between a desired region to be irradiated with light and a region other than the desired region can be increased, and the light with which the desired region is irradiated can be made conspicuous.

If the light-emitting module 100 is used as a flash light source of the imaging device, the light-emitting module 100 can emit light by switching between a wide-angle mode and a narrow-angle mode. In the wide-angle mode, all the light-emitting parts 10 emit light, and in the narrow-angle mode, only light-emitting parts 10 located near the center of the light-emitting region 16 emit light, and light-emitting parts 10 located near the outer edge G2 of the light-emitting region 16 do not emit light. In the narrow-angle mode, the light distribution angle is narrower than that in the wide-angle mode. In the light-emitting module 100, irradiation light can be switched in accordance with the wide-angle mode or the narrow-angle mode. Thus, by using light emitted from the light-emitting module 100, the imaging device can capture an image in accordance with a photographing mode such as close-up photography or telephoto photography.

In the light-emitting module 100, light L from a light-emitting part 10 of the plurality of the light-emitting parts 10 after being transmitted through the lens 2 is emitted to a region located opposite the position of the light-emitting part 10 of the plurality of the light-emitting parts 10 with respect to a point P on an optical axis 20 of the lens 2. In the present embodiment, the optical axis 20 of the lens 2 is the optical axis 20 of the effective portion 21. Accordingly, on the irradiation surface to be irradiated with light from the light-emitting module 100, the relationship between the light-emitting part 10 of the plurality of the light-emitting parts 10 and an irradiation position irradiated with the light L from the light-emitting part 10 can be easily ascertained, and thus light control can be easily performed. Further, in the light-emitting module 100, most of light L from the light-emitting parts 10 passes through a first convex surface 24 and a second convex surface 25 of the lens 2. Therefore, the light-emitting module 100 can irradiate a desired region with the light L from the light source 1 by using the first convex surface 24 and the second convex surface 25.

Further, in the example illustrated in FIG. 2, the light-emitting module 100 includes the second region 312 such that the second region 312 overlaps a region outward of the effective portion 21 of the lens 2 in a top view. Therefore, the effective outer edge G1 of the effective portion 21 and the region outward of the effective outer edge G1 in the light-emitting module 100 are less likely to be visually recognized from the outside of the light-emitting module 100. Accordingly, the aesthetic appearance of the light-emitting module 100 can be improved.

Lens 2

The lens 2 is an optical element disposed over the light source 1 and configured to transmit the light L from the light source 1. In the example illustrated in FIG. 2, the lens 2 includes the effective portion 21, an outer lens portion 22, and a leg portion 23. The effective portion 21 is constituted by the first convex surface 24 and the second convex surface 25. The first convex surface 24 protrudes in a direction (to the −Z side) in which the light source 1 is located. The second convex surface 25 protrudes in a direction (to the +Z side) opposite to the direction in which the light source 1 is located. The outer lens portion 22 is an annular portion provided outward of the effective portion 21 in a top view. In the present embodiment, the term "annular" includes not only a circular shape such as a ring but also a closed shape that does not intersect itself. The outer lens portion 22 is provided outward of the effective portion 21 of the lens 2 and protrudes to the +Z side (hereinafter may be referred to as an "upper side" or "upward").

The leg portion 23 is an annular portion provided outward of the effective portion 21 in a top view. The leg portion 23 is provided outward of the effective portion 21 of the lens 2 and extends to the −Z side (hereinafter may be referred to as a "lower side" or "downward"). The leg portion 23 is disposed on the upper surface of the wiring substrate 5 via an adhesive member or the like. The leg portion 23 supports the effective portion 21 and the outer lens portion 22 of the lens 2 such that the effective portion 21 is disposed above the light source 1 and the outer lens portion 22 is disposed outward of the effective portion 21 in a top view.

In the example illustrated in FIG. 2, the outer lens portion 22 has a plurality of concentric projections on a light emission surface that is the upper surface of the lens 2. The plurality of concentric projections are arranged around the optical axis 20 of the lens 2. The plurality of concentric projections have a sawtooth shape or a wave shape. The plurality of concentric projections can have, for example, a Fresnel shape. The plurality of concentric projections of the outer lens portion 22 reflect or refract light (stray light) emitted particularly from light-emitting parts 10 located outward in a top view and traveling toward the outside of the light-emitting module 100, such that the light can be used as irradiation light that passes through the first region 311 of the cover member 3 and is emitted. Further, the projections of the outer lens portion 22 compensate for the light condensing performance of the lens 2, which decreases as distance from the optical axis 20 increases in a direction orthogonal to the optical axis 20. The light-emitting module 100 can reduce stray light by the outer lens portion 22 having the projections.

In the light-emitting module 100, the lens 2 preferably includes a convex lens. The first convex surface 24 and the second convex surface 25 of the effective portion 21 of the lens 2 form a biconvex lens. The light L from the light source 1 is once focused on a focal point F, located at the center P, by the first convex surface 24 and the second convex surface 25, and then emitted onto the irradiation surface as divergent light. In the lens 2 including the convex lens, the focal point F is on the +Z side of the lens 2. The light L from the plurality of light-emitting parts 10 is concentrated on the focal point F, and then spreads. Accordingly, for example, in a case where the light-emitting module 100 is installed in a smartphone or the like, blockage of the light L from the light-emitting module 100 by a housing of the smartphone or the like can be reduced. Further, the light L from the light source 1 can be efficiently emitted through the lens 2. However, the lens 2 is not limited to a biconvex lens, and can be a plano-convex lens, a biconcave lens, a plano-concave lens, a Fresnel lens, a combined lens composed of a plurality of lenses, an array lens, a meniscus lens, an aspherical lens, a cylindrical lens, or the like.

The shape of the lens 2 in a top view is a substantially circular shape. However, the shape of the lens 2 in a top view can be a substantially rectangular shape, a substantially elliptical shape, a substantially polygonal shape, or the like. Further, the shape of the lens 2 in a top view can be a rotational symmetry shape. Considering that an imaging range of a general imaging device is substantially rectangular, it is preferable that the shape of the lens 2 in a top view is a four-fold rotational symmetry shape or a two-fold rotational symmetry shape. In the lens 2, the radii of curvature of the first convex surface 24 and the second convex surface 25, the magnitude relationship between the radii of curvature, the thickness of the lens, and the like can also be appropriately changed.

The lens 2 includes at least one of a resin material or a glass material that has light transmissivity with respect to the light emitted from the light source 1. Examples of the resin material include a polycarbonate resin, an acrylic resin, a silicone resin, or an epoxy resin. In the example illustrated in FIG. 2, the effective portion 21, the outer lens portion 22, and the leg portion 23 are connected to each other as an integrated member. As used herein, the "light transmissivity" of the lens 2 refers to a property of transmitting 60% or more of the light L from the light source 1.

Cover Member 3

In the example illustrated in FIG. 2, the cover member 3 includes a cover portion 31 and a support portion 32. In the cover member 3, the support portion 32 is provided on the entire outer periphery of the cover portion 31 in a top view. The lower surface 31d of the cover member 3 refers to the lower surface of the cover portion 31. The upper surface 31u of the cover member 3 refers to the upper surface of the cover portion 31 and the upper surface of the support portion 32. The cover portion 31 and the support portion 32 are integrally molded.

In the example illustrated in FIG. 2, the cover portion 31 is disposed over the lens 2 so as to overlap the light source 1 and the lens 2 in a top view. The support portion 32 is provided so as to extend downward from the outer edge of the cover portion 31. The support portion 32 is disposed on the lateral surface of the wiring substrate 5 via an adhesive member or the like, such that the lateral surface of the support portion 32 faces the lateral surface of the wiring substrate 5. The support portion 32 supports the cover portion 31 such that the cover portion 31 is disposed above the lens 2. In the example illustrated in FIG. 1, the shape of the cover member 3 in a top view is a substantially circular shape. However, the shape of the cover member 3 in a top view can be a substantially rectangular shape, a substantially elliptical shape, a substantially polygonal shape, or the like.

The lower surface 31d of the cover member 3 includes the first region 311 and the second region 312 surrounding the entire periphery of the first region 311 in a top view. The inner edge of the second region 312 contacts the outer edge of the first region 311. The second region 312 is a region indicated by dot hatching in FIG. 1.

The shape of the outer edge of the first region 311 in a top view is a substantially circular shape. The shape of each of the inner edge and the outer edge of the second region 312 in a top view is a substantially circular shape. In other words, the second region 312 is an annular region. That is, the first region 311 is located inward of the annular second region 312 in a top view. Further, the annular second region 312 overlaps the plurality of concentric projections of the outer lens portion 22. In the example illustrated in FIG. 1 and FIG. 2, a center Q of the first region 311, the optical axis 20 of the lens 2, and a center C of the light source 1 (the center of the light-emitting parts 10) overlap each other in a top view. However, the shapes of the inner edge and the outer edge of the second region 312 can be different from each other in a top view, and can each be a substantially rectangular shape, a substantially elliptical shape, a substantially polygonal shape, or the like.

In the light-emitting module 100, the lower surface 31d of the cover member 3 in the second region 312 is provided with at least one of a rough surface or one or more projections. In the example illustrated in FIG. 2, the lower surface 31d of the cover member 3 in the second region 312 is provided with a rough surface. Conversely, the lower surface 31d of the cover member 3 in the first region 311 is a flat surface that is not a rough surface. The flat surface preferably has an arithmetic average roughness Ra of less than 0.3 μm, and more preferably 0.2 μm or less. The rough surface preferably has an arithmetic average roughness Ra of 0.3 μm or more and 2.0 μm or less, and more preferably 0.5 μm or more and 1.5 μm or less. The rough surface can be formed by blasting, laser processing, molding, or the like. Alternatively, a glass surface before being subjected to polishing can be used as the rough surface without being subjected to polishing. By providing the lower surface 31d of the cover member 3 in the second region 312 with at least one of a rough surface or one or more projections, the second region 312 has a higher light diffusivity than that of the first region 311. The first region 311 has a lower light diffusivity than that of the second region 312, and preferably has almost no light diffusivity. Accordingly, of the light L from the light source 1, light incident on the second region 312—that is, light that becomes stray light—is diffused and emitted from the upper surface 31u of the cover member 3 overlapping the second region 312 in a top view. As a result, the light transmitted through the second region 312 can be made inconspicuous, and light passing through the inside of the first region 311 in a top view can be made conspicuous.

In the light-emitting module 100, light diffusivity can be imparted to the second region 312 by disposing a light diffusing substance on the lower surface 31d of the cover member 3 in the second region 312. As the light diffusing substance, titanium oxide, barium titanate, aluminum oxide, silicon oxide, or the like can be used. The light diffusing substance can be disposed on the lower surface 31d of the cover member 3 by, for example, applying a resin containing the light diffusing substance to the lower surface 31d or attaching a plate-shaped member containing the light diffusing substance to the lower surface 31d.

Further, in the light-emitting module 100, light diffusivity can be imparted to the second region 312 by causing the cover member 3 overlapping the second region 312 in a top view to contain the light diffusing substance therein.

Further, in the light-emitting module 100, the light diffusing substance can be disposed in a region of the upper surface 31u of the cover member 3 overlapping the second region 312 in a top view. For example, in the light-emitting module 100, the light diffusing substance is disposed in a desired region of the upper surface 31u of the cover member 3 by ink jet printing or the like.

The cover member 3 includes at least one of a resin material such as a polycarbonate resin, an acrylic resin, a silicone resin, or an epoxy resin, or a glass material, which have light transmissivity with respect to the light emitted from the plurality of light-emitting parts 10. As used herein, the "light transmissivity" of the cover member 3 in the first region 311 and the second region 312 refers to a property of transmitting 60% or more of the light L from the light source 1.

In the example illustrated in FIG. 1 and FIG. 2, the support portion 32 is a cylindrical portion having a substantially circular shape in a top view. However, the shape of the support portion 32 in a top view can be a substantially elliptical shape, a substantially polygonal shape or the like.

Light-Transmissive Member 4

The light-transmissive member 4 is a member configured to protect the upper surface 31u of the cover member 3. The light-transmissive member 4 has light transmissivity, and is configured to transmit light incident on the lower surface 31d of the cover member 3 in the first region 311 and the second region 312 and emitted from the upper surface 31u of the cover member 3. The light-transmissive member 4 has almost no influence on the light transmissivity and the light diffusivity of the first region 311 and the second region 312. The light-transmissive member 4 is composed of a resin material, such as a polycarbonate resin, an acrylic resin, a silicone resin, an epoxy resin, or a urethane resin, or a glass material, and is composed of a material having a higher hardness than that of the cover member 3. The light-transmissive member 4 can contain an appropriate amount of a light diffusing substance such as silicon dioxide or aluminum oxide, as long as the light diffusivity of the second region 312 is higher than the light diffusivity of the first region 311. As used herein, "light transmissivity" means that 60% or more of light from a light-emitting element 12 is preferably transmitted. The thickness of the light-transmissive member 4 is preferably 0.1 μm or more and 100 μm or less from the viewpoint of strength for protection.

The light-transmissive member 4 can be disposed on the cover member 3 by spraying, potting, sputtering, atomic layer deposition (ALD), or the like. If atomic layer deposition is used, the film thickness can be controlled at an atomic layer level, and a flat and dense light-transmissive member 4 can be disposed on the cover member 3. Alternatively, a light-transmissive member 4 that has been separately molded can be disposed on the cover member 3 by using an adhesive member such as a resin.

If the upper surface of a cover member includes a second region including a rough surface or one or more projections, and a light-transmissive member is disposed in contact with the second region of the upper surface of the cover member, the light-transmissive member would bury the rough surface or the one or more projection of the upper surface of the cover member. Therefore, a light diffusion function utilizing the surface shape of the second region would not be effectively utilized, and the light diffusivity of the second region would be significantly decreased. In light of the above, in the embodiment of the present disclosure, the lower surface of the cover member 3 includes the first region 311 and the second region 312, and the upper surface 31u of the cover member 3 is covered by the light-transmissive member 4 so as to prevent damage to the upper surface 31u of the cover member 3 while improving the chemical resistance and the like of the upper surface 31u of the cover member 3. As a result, stray light of the light L emitted from the light source 1 can be effectively reduced.

In the present embodiment, a structure including the lens 2, the cover member 3, and the light-transmissive member 4 is referred to as a cover structure 7. The cover structure 7 includes the cover member 3 disposed over the lens 2 and having the lower surface 31d and the upper surface 31u. The lower surface 31d of the cover member 3 includes the first region 311 and the second region 312 provided around the first region 311 and having a higher light diffusivity than that of the first region 311. The upper surface 31u of the cover member 3 is covered by the light-transmissive member 4 having a higher hardness than that of the cover member 3.

The light-emitting module 100 according to the present embodiment includes the cover structure 7. In the cover structure 7 according to the present embodiment, the leg portion 23 of the lens 2 is disposed on the upper surface of the wiring substrate 5 via an adhesive member or the like, and the support portion 32 of the cover member 3 is disposed on the lateral surface of the wiring substrate 5 via an adhesive member or the like, such that the lateral surface of the support portion 32 faces the lateral surface of the wiring substrate 5, thereby allowing the lens 2 and the cover member 3 to be fixed relative to each other. That is, in the cover structure 7 according to the present embodiment, the lens 2 and the cover member 3 are fixed via another member in a state in which the lens 2 and the cover member 3 are not directly or indirectly bonded to each other. The lens 2 and the cover member 3 can be directly or indirectly bonded to each other. For example, even in a case where the lens 2 and the cover member 3 are fixed to each other by direct bonding or bonding via an adhesive member or the like, a structure including the lens 2, the cover member 3, and the light-transmissive member 4 is the cover structure 7.

Light Source 1

Figure 3:
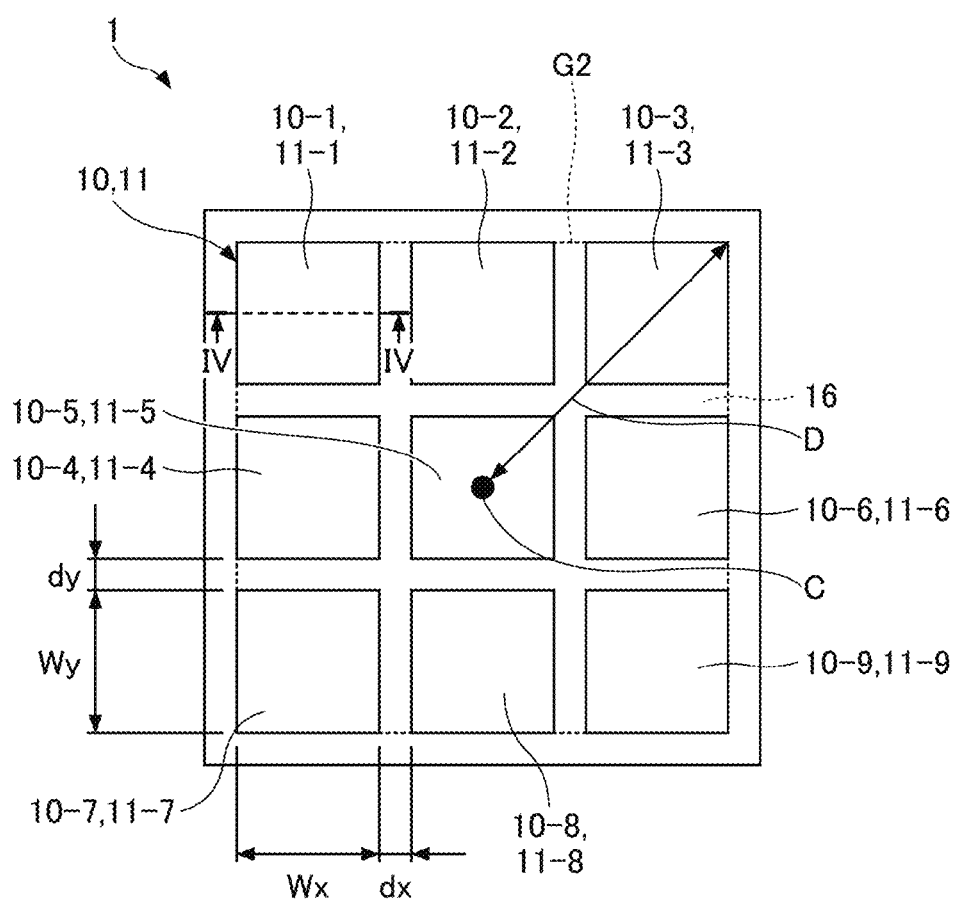
FIG. 3 is a schematic top view illustrating an example configuration of a light source of the light-emitting module according to the first embodiment.
Figure 4:
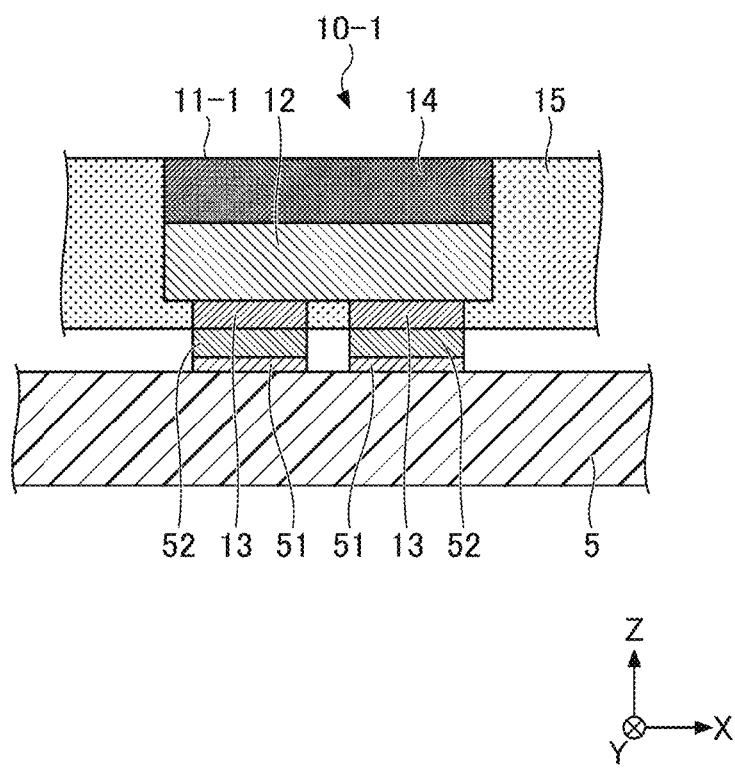
FIG. 4 is a schematic cross-sectional view taken through line IV-IV of FIG. 3.

A configuration of the light source 1 of the light-emitting module 100 will be described in detail with reference to FIG. 3 and FIG. 4. FIG. 3 is a schematic top view illustrating an example of a configuration of the light source 1. FIG. 4 is a schematic cross-sectional view taken through line IV-IV of FIG. 3.

In the example illustrated in FIG. 3, the light source 1 includes the plurality of light-emitting parts 10 having the respective light-emitting surfaces 11. The plurality of light-emitting parts 10 emit light from the respective light-emitting surfaces 11 toward the lens 2 disposed above the light source 1. The light-emitting surfaces 11 refer to main light extraction surfaces of the light-emitting parts 10.

In the example illustrated in FIG. 3, the light source 1 includes the plurality of light-emitting parts 10 arranged in the lengthwise direction or the widthwise direction or in a matrix in a top view. Specifically, the light source 1 includes nine light-emitting parts 10-1, 10-2, 10-3, 10-4, 10-5, 10-6, 10-7, 10-8, and 10-9. The nine light-emitting parts 10 correspond to a plurality of light-emitting parts. The plurality of light-emitting parts 10 are arranged along the X direction or arranged along the X direction and the Y direction. In FIG. 3, the nine light-emitting parts 10 are arranged along the X direction and the Y direction.

The nine light-emitting parts 10 have respective nine light-emitting surfaces 11. That is, the light-emitting part 10-1 has a light-emitting surface 11-1, the light-emitting part 10-2 has a light-emitting surface 11-2, the light-emitting part 10-3 has a light-emitting surface 11-3, the light-emitting part 10-4 has a light-emitting surface 11-4, and the light-emitting part 10-5 has a light-emitting surface 11-5. Further, the light-emitting part 10-6 has a light-emitting surface 11-6, the light-emitting part 10-7 has a light-emitting surface 11-7, the light-emitting part 10-8 has a light-emitting surface 11-8, and the light-emitting part 10-9 has a light-emitting surface 11-9. The light-emitting surface 11-1 to the light-emitting surface 11-9 are preferably disposed inward of the lens 2 (inward relative to the outer shape of the lens 2) in a top view, and are more preferably disposed inward relative to the effective portion 21. The light-emitting parts 10 overlap the light-emitting surfaces 11 in a top view. Thus, the reference numeral of each of the light-emitting parts 10 and the reference numeral of a corresponding light-emitting surface 11 are written together in FIG. 3. Further, in the following description, if two or more components substantially coincide with each other or overlap each other, reference numerals can be written together.

In the example illustrated in FIG. 3, the shape of a light-emitting surface 11 in a top view is a substantially rectangular shape. A first width Wx represents the width of the light-emitting surface 11 in the X direction. A second width Wy represents the width of the light-emitting surface 11 in the Y direction. The first width Wx and the second width Wy are, for example, 50 µm or more and 2,000 µm or less, and preferably 200 µm or more and 1,000 µm or less. The first width Wx and the second width Wy can be substantially equal to each other or can be different from each other. In the present embodiment, light-emitting surfaces 11 of adjacent light-emitting parts 10 are arranged at a predetermined interval in a top view. Each of a first light-emitting surface interval dx in the X direction and a second light-emitting surface interval dy in the Y direction corresponds to the predetermined interval. From the viewpoint of light emission characteristics of the light-emitting module 100, the smaller the first light-emitting surface interval dx and the second light-emitting surface interval dy, the more preferable. However, there are limits to intervals at which the plurality of light-emitting parts 10 can be mounted. To obtain both good light emission characteristics and intervals at which the plurality of the light-emitting parts 10 can be mounted, the first light emitting surface distance dx and the second light emitting surface distance dy are both preferably 10 µm or more and 50 µm or less. The shape of the light-emitting surface 11 in a top view can be a substantially circular shape or a substantially elliptical shape, or can be a polygonal shape such as a substantially triangular shape or a substantially hexagonal shape.

Light-Emitting Part 10

As illustrated in FIG. 4, the light-emitting part 10-1 is disposed on the surface on the +Z side of the wiring substrate 5, with the upper surface of the light-emitting part 10-1 serving as the light-emitting surface 11-1 and the surface opposite to the light-emitting surface 11-1 serving as a mounting surface. The light-emitting part 10-1 includes a light-emitting element 12, a wavelength conversion member 14 provided above the light-emitting element 12, and a light-shielding member 15 covering the lateral surfaces of the light-emitting element 12 and the lateral surfaces of the wavelength conversion member 14 except for the upper surface of the wavelength conversion member 14. In other words, the lateral surfaces of the light-emitting element 12 and the lateral surfaces of the wavelength conversion member 14 are covered by the light-shielding member 15. With this configuration, light leaking from the lateral surfaces of the light-emitting element 12 and the lateral surfaces of the wavelength conversion member 14 is reduced, and thus a desired region can be irradiated with light from the light source 1.

The light shielding member 15 is continuous between adjacent light-emitting parts 10 of the plurality of the light-emitting parts 10 included in the light source 1. That is, the light shielding member 15 integrally holds a plurality of the light-emitting elements 12 and a plurality of wavelength conversion members 14. With this configuration, the plurality of the light-emitting parts 10 can be collectively mounted, and the interval between adjacent light-emitting surfaces 11 can be narrowed.

In the example illustrated in FIG. 3, light-emitting surfaces 11 of adjacent light-emitting parts 10 of the plurality of light-emitting parts 10 included in the light source 1 are spaced apart from each other by the light-shielding member 15; however, the adjacent light-emitting surfaces 11 can be continuous with each other. For example, one wavelength conversion member 14 can cover the entirety of a plurality of light-emitting elements 12. In this case, the first light-emitting surface interval dx and the second light-emitting surface interval dy are 0.

At least one pair of positive and negative electrodes 13 are provided on the surface (lower surface) of the light-emitting element 12 opposite the light-emitting surface 11-1.

The light-emitting element 12 preferably includes various semiconductors such as group III-V compound semiconductors and group II-VI compound semiconductors. As the semiconductors, nitride-based semiconductors such as $In_XAl_YGa_{1-X-Y}N$ ($0 \leq X$, $0 \leq Y$, $X+Y \leq 1$) are preferably used, and InN, AlN, GaN, InGaN, AlGaN, InGaAlN, and the like can also be used. The light-emitting element 12 is, for example, an LED or a laser diode (LD). The emission peak wavelength of the light-emitting element 12 is preferably 400 nm or more and 530 nm or less, more preferably 420 nm or more and 490 nm or less, and even more preferably 450 nm or more and 475 nm or less, from the viewpoint of emission efficiency, excitation of a wavelength conversion substance, and the like.

The wavelength conversion member 14 is a member having, for example, a substantially rectangular shape in a top view. The wavelength conversion member 14 is disposed so as to cover the upper surface of the light-emitting element 12. The wavelength conversion member 14 includes a wavelength conversion substance that converts a wavelength of at least a portion of light from the light-emitting element 12. The wavelength conversion member 14 can be formed by using a light-transmissive resin material or an inorganic material such as a ceramic or glass. As the resin material, a thermosetting resin such as a silicone resin, a silicone-modified resin, an epoxy resin, an epoxy-modified resin, or a phenol resin can be used. In particular, a silicone resin or a modified resin thereof having high light resistance and heat resistance is preferable. As used herein, the term "light-transmissive" means that 60% or more of the light from the light-emitting element 12 is preferably transmitted. Further, a thermoplastic resin such as a polycarbonate resin, an acrylic resin, a methylpentene resin, or a polynorbornene resin can be used for the wavelength conversion member 14. Further, the wavelength conversion member 14 can contain the above-described light diffusing substance in the above-described resin. For example, the wavelength conversion member 14 can be a resin material, a ceramic, glass, or the like containing a wavelength conversion substance, a sintered body of a wavelength conversion substance, or the like. Further, the wavelength conversion member 14 can be a multilayer member in which a resin layer is disposed on the surface on the ±Z side of a molded body made of a resin, a ceramic, glass, or the like.

Examples of a wavelength conversion substance contained in the wavelength conversion member 14 include yttrium aluminum garnet based phosphors (for example, $(Y,Gd)_3(Al,Ga)_5O_{12}:Ce$), lutetium aluminum garnet based phosphors (for example, $Lu_3(Al,Ga)_5O_{12}:Ce$), terbium aluminum garnet based phosphors (for example, $Tb_3(Al,Ga)_5O_{12}:Ce$), CCA based phosphors (for example, $Ca_{10}(PO_4)_6Cl_2:Eu$), SAE based phosphors (for example, $Sr_4Al_{14}O_{25}:Eu$), chlorosilicate based phosphors (for example, $Ca_8MgSi_4O_{16}Cl_2:Eu$), silicate based phosphors (for example, $(Ba,Sr,Ca,Mg)_2SiO_4:Eu$), oxynitride based phosphors such as β-SiAlON based phosphors (for example, $(Si,Al)_3(O,N)_4:Eu$) and α-SiAlON based phosphors (for example, $Ca(Si,Al)_{12}(O,N)_{16}:Eu$), nitride based phosphors such as LSN based phosphors (for example, $(La,Y)_3Si_6N_{11}:Ce$), BSESN based phosphors (for example, $(Ba,Sr)_2Si_5N_8:Eu$), SLA based phosphors (for example, $SrLiAl_3N_4:Eu$), CASN based phosphors (for example, $CaAlSiN_3:Eu$), and SCASN based phosphors (for example, $(Sr,Ca)AlSiN_3:Eu$), fluoride based phosphors such as KSF based phosphors (for example, $K_2SiF_6:Mn$), KSAF based phosphors (for example, $K_2(Si_{1-x}Al_x)F_{6-x}:Mn$, where x satisfies 0<x<1), and MGF based phosphors (for example, $3.5MgO \cdot 0.5MgF_2 \cdot GeO_2:Mn$), quantum dots having a Perovskite structure (for example, $(Cs,FA,MA)(Pb,Sn)(F,Cl,Br,I)_3$, where FA and MA represent formamidinium and methylammonium, respectively), II-VI quantum dots (for example, CdSe), III-V quantum dots (for example, InP), and quantum dots having a chalcopyrite structure (for example, $(Ag,Cu)(In,Ga)(S,Se)_2$). The wavelength conversion substances described above are particles. One of these wavelength conversion substances can be used alone, or two or more of these wavelength conversion substances can be used in combination.

In the light-emitting module 100, a blue light emitting element is used as the light-emitting element 12. The wavelength conversion member 14 contains a wavelength conversion substance that converts the wavelength of the light emitted from the light-emitting element 12 into the wavelength of yellow. Accordingly, white light can be emitted.

The light-shielding member 15 is a member covering the lateral surfaces of the light-emitting element 12 and the lateral surfaces of the wavelength conversion member 14. The light-shielding member 15 directly or indirectly covers the lateral surfaces of the light-emitting element 12 and the lateral surfaces of the wavelength conversion member 14. The upper surface of the wavelength conversion member 14 is exposed through the light-shielding member 15, and is the light-emitting surface 11-1 of the light-emitting part 10-1. The light-shielding member 15 can be separated between adjacent light emitting parts of the plurality of light-emitting parts 10. In order to improve the light extraction efficiency, the light-shielding member 15 is preferably formed of a member having a high light reflectance. For example, a resin material containing a light reflective substance such as a white pigment can be used for the light-shielding member 15.

Examples of the light reflective substance include titanium oxide, zinc oxide, magnesium oxide, magnesium carbonate, magnesium hydroxide, calcium carbonate, calcium hydroxide, calcium silicate, magnesium silicate, barium titanate, barium sulfate, aluminum hydroxide, aluminum oxide, zirconium oxide, silicon oxide, and the like. It is preferable to use one of the above substances alone or a combination of two or more of the above substances. Further, as the resin material, it is preferable to use a base material including a resin material whose main component is a thermosetting resin such as an epoxy resin, an epoxy-modified resin, a silicone resin, a silicone-modified resin, or a phenol resin.

The light-emitting part 10 is electrically connected to wiring 51 of the wiring substrate 5. The wiring substrate 5 includes the wiring 51 on the surface of the wiring substrate 5. The wiring substrate 5 can include the wiring 51 inside the wiring substrate 5. The light-emitting part 10 and the wiring substrate 5 are electrically connected to each other by connecting the wiring 51 of the wiring substrate 5 to at least the positive and negative electrodes 13 of the light-emitting part 10 via electrically-conductive members 52.

As a base material of the wiring substrate 5, an insulating material is preferably used, and a material that does not easily transmit light emitted from the light-emitting part 10, external light, or the like is preferably used. Further, a material having a certain strength is preferably used for the wiring substrate 5. Specifically, as the base material of the wiring substrate 5, a ceramic such as alumina, aluminum nitride, mullite, or silicon nitride, or a resin such as a phenol resin, an epoxy resin, a polyimide resin, a bismaleimide-triazine resin (BT resin), polyphthalamide, or a polyester resin can be used.

The wiring 51 can be composed of at least one of copper, iron, nickel, tungsten, chromium, aluminum, silver, gold, titanium, palladium, rhodium, or an alloy thereof. In addition, a layer of silver, platinum, aluminum, rhodium, gold, an alloy thereof, or the like can be provided on the surface layer of the wiring 51 from the viewpoint of wettability and/or light reflectivity of the electrically-conductive members 52.

Main Effects of Cover Member 3

Figure 5:
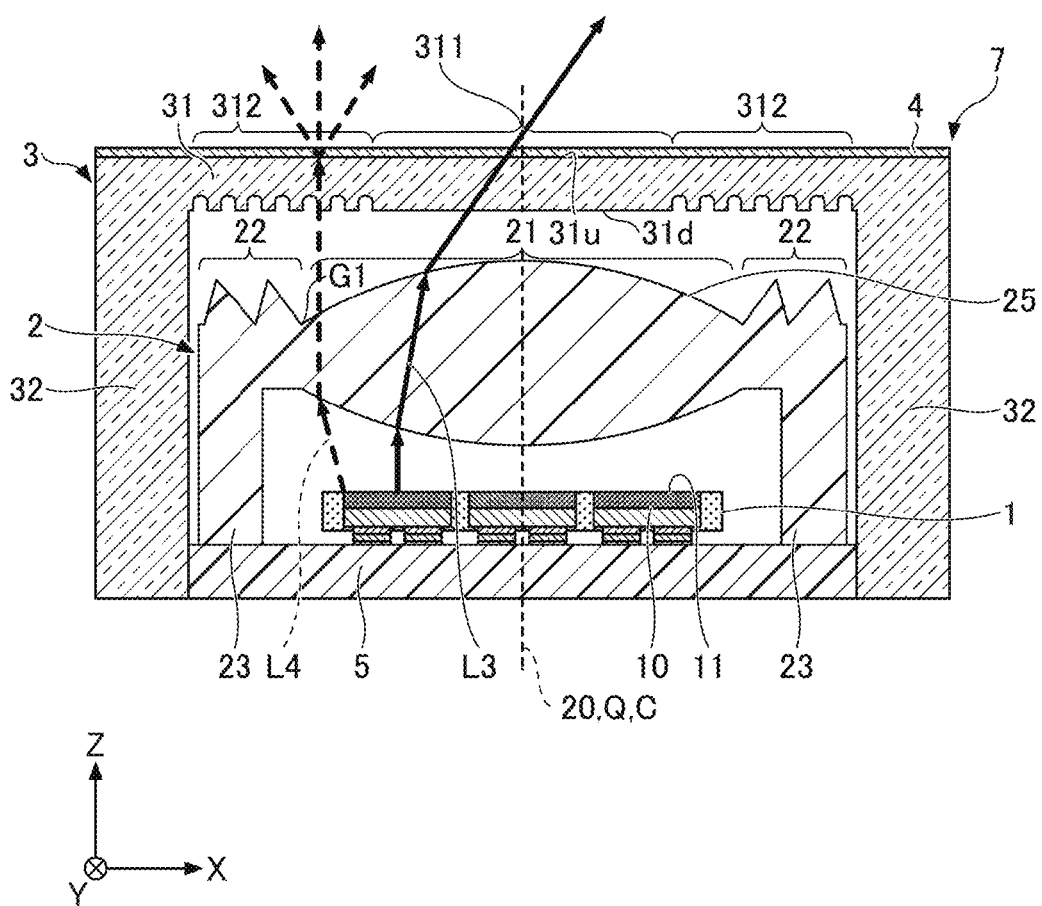
FIG. 5 is a schematic cross-sectional view taken through the line II-II of FIG. 1, and is a first diagram illustrating effects of a cover member of the light-emitting module of FIG. 1.
Figure 6:
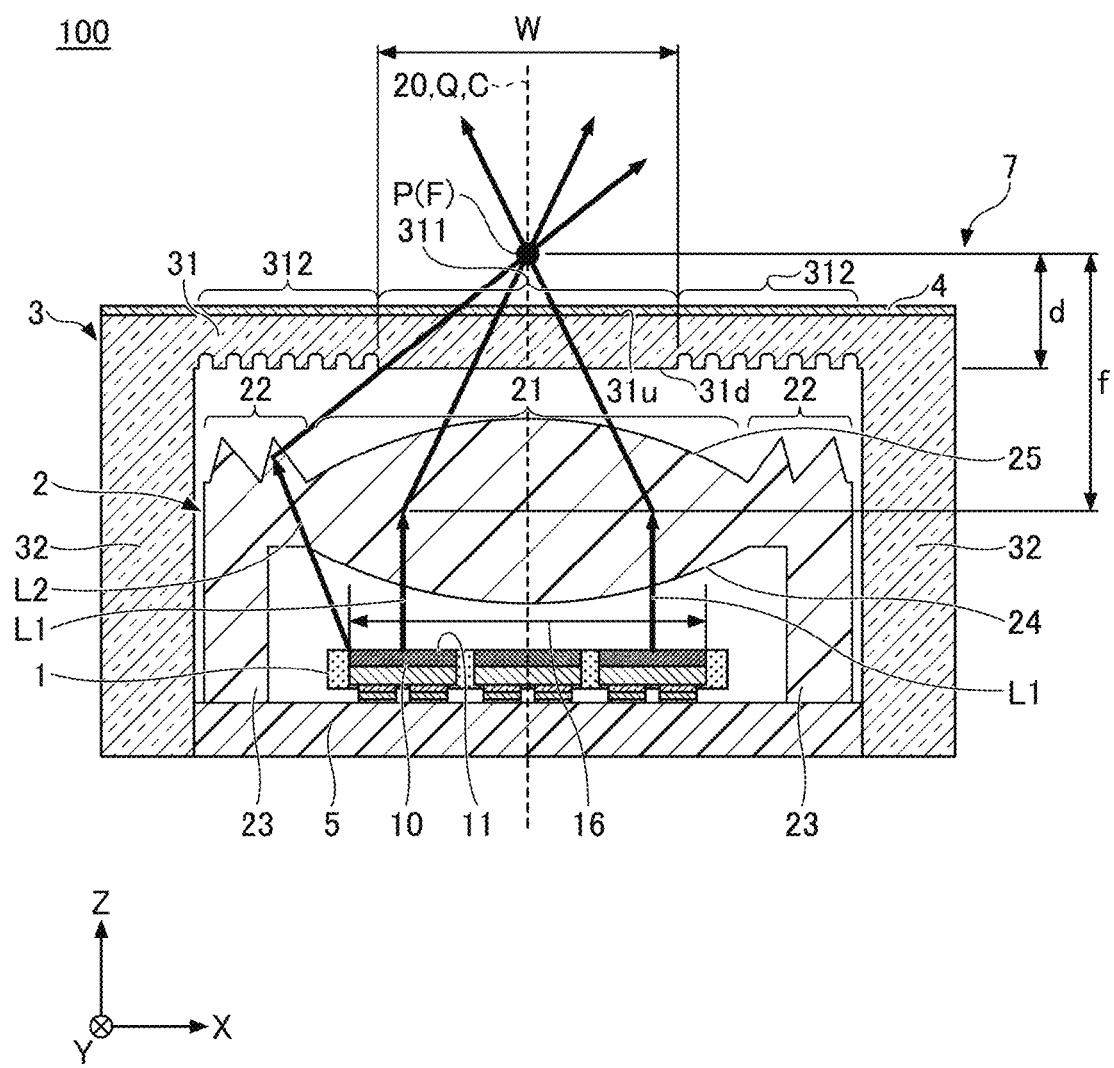
FIG. 6 is a schematic cross-sectional view taken through line VI-VI of FIG. 1, and is a second diagram illustrating effects of the cover member of the light-emitting module of FIG. 1.

Effects of the cover member 3 of the light-emitting module 100 will be described with reference to FIG. 5 and FIG. 6. FIG. 5 is a schematic cross-sectional view taken through the line II-II of FIG. 1, and is a first diagram illustrating effects of the cover member 3 of the light-emitting module 100. FIG. 6 is a schematic cross-sectional view taken through line VI-VI of FIG. 1, and is a second diagram illustrating effects of the cover member 3 of the light-emitting module 100.

In FIG. 5, first light L3 indicated by a solid line is light emitted from the light source 1, passing through the vicinity of the center of the effective portion 21 of the lens 2, and then passing through the first region 311 of the cover member 3. Second light L4 indicated by a dashed line is light emitted from the light source 1, passing through the inside of the effective outer edge G1 of the effective portion 21 of the lens 2, and then passing through the second region 312 of the cover member 3.

As illustrated in FIG. 5, the second light L4 is diffused by the second region 312. Thus, stray light generated due to light having passed through the inside of the effective outer edge G1 of the effective portion 21 of the lens 2 or light having passed through the outer lens portion 22 can be reduced. Accordingly, in the light-emitting module 100, stray light included in light emitted from the light-emitting module 100 can be reduced. Thus, light can be emitted to a desired region, and light emitted to regions other than the desired region can be reduced. In addition, by providing the second region 312 so as to overlap the plurality of concentric projections of the outer lens portion 22 in a top view, the plurality of concentric projections are less likely to be visually recognized when the light-emitting module 100 is viewed from the +Z side of the upper surface 31u of the cover member 3. Accordingly, the aesthetic appearance of the light-emitting module 100 can be improved.

As illustrated in FIG. 3, in the light-emitting module 100, the light source 1 includes the light-emitting region 16 including the nine light-emitting surfaces 11. Further, as illustrated in FIG. 6, f represents the focal length of the lens 2, and d represents the shortest distance from the focal point F of the lens 2 to the lower surface 31d of the cover member 3 on the optical axis 20 of the lens 2. Further, as illustrated in FIG. 3, D represents the longest distance from a center C of the light-emitting region 16 to the outer edge G2 of the light-emitting region 16 in a direction along the light emitting surfaces 11. In the example illustrated in FIG. 3 and FIG. 6, nine light-emitting parts 10 are arranged in a 3×3 matrix, and the light-emitting region 16 has a substantially square shape. Therefore, the longest distance D is a distance from the center C of a light emitting part 10 at the center (second row and second column) to a corner of the square surrounded by the outer edge G2 of the light-emitting region 16. A maximum width W of the first region 311 in a direction along the lower surface 31d of the cover member 3 is represented by the following formula:

$$W \geq 2 \times D \times d / f,$$

The shortest distance d from the focal point F of the lens 2 to the lower surface 31d of the cover member 3 on the optical axis 20 of the lens 2 is, in other words, a distance from the focal point F to the lower surface 31d on a straight line connecting the focal point F of the lens 2 to the center C of the light-emitting region 16.

With the above-described configuration, stray light generated due to light having passed through the outer lens portion 22 of the lens 2 or light having passed through the vicinity of the effective outer edge G1 of the effective portion 21 of the lens 2 is reduced by the light diffusion effect of the second region 312. Accordingly, in the light-emitting module 100, stray light included in irradiation light from the light-emitting module 100 can be reduced. Thus, light can be emitted to a desired region, and light emitted to regions other than the desired region can be reduced. Further, first light L1 emitted from the light source 1 and passed through the effective portion 21 of the lens 2 passes through the inside of the first region 311 of the cover member 3. Thus, the first light L1 is less likely to be affected by light diffusion of the cover member 3, and can be emitted to a desired region.

Another Example of Cover Member

Figure 7:
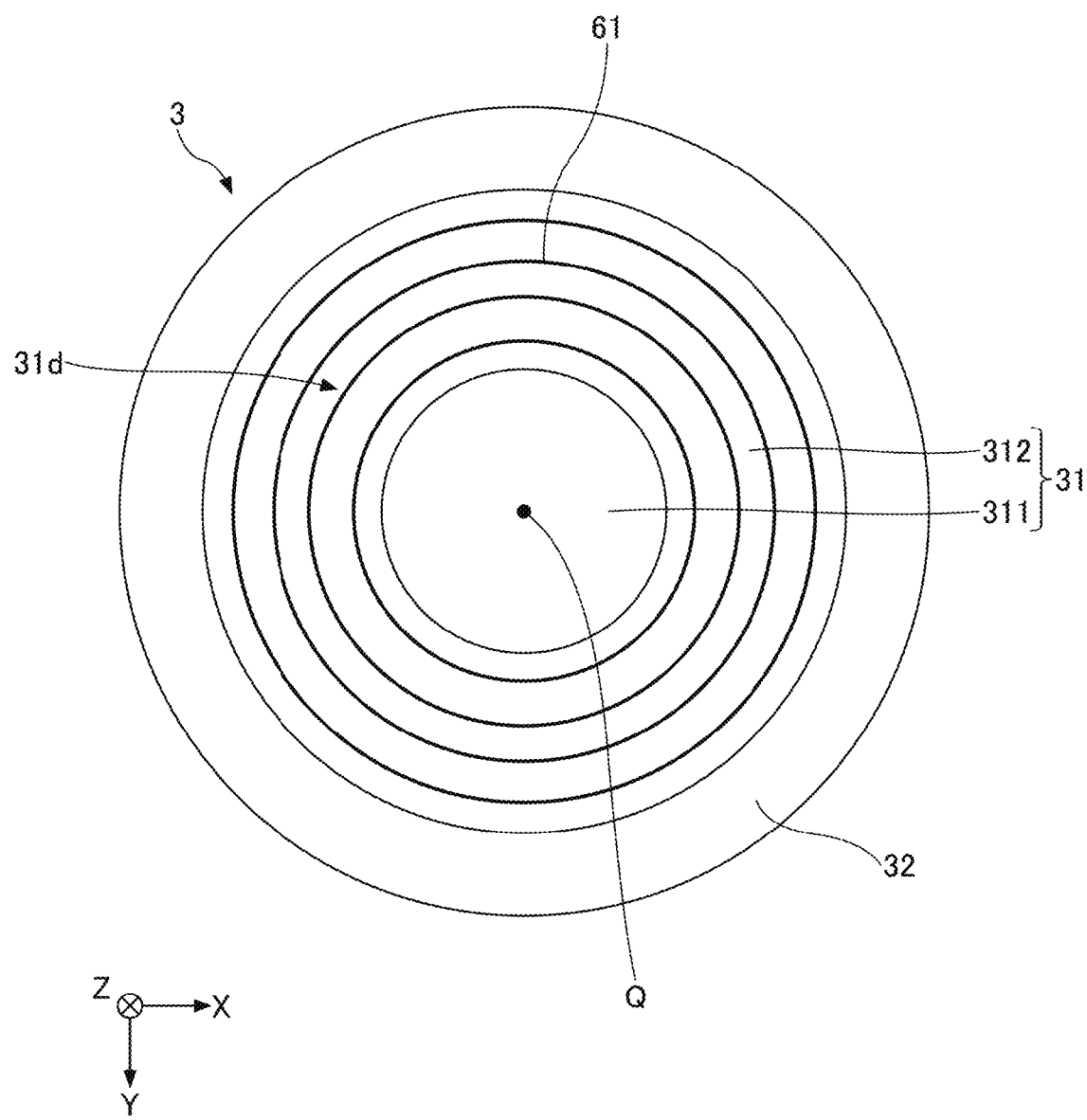
FIG. 7 is a schematic bottom view illustrating another example of a cover member.

FIG. 7 is a schematic bottom view illustrating another example of a cover member 3. In the example illustrated in FIG. 7, the lower surface 31d of the cover member 3 in the second region 312 is provided with a plurality of projections 61. In the example illustrated in FIG. 7, the plurality of projections 61 are arranged at substantially equal intervals concentrically around the center Q of the first region 311. The plurality of projections 61 have a sawtooth shape or a wave shape. The plurality of concentric projections 61 can have a Fresnel shape. In the example illustrated in FIG. 7, the number of the plurality of projections 61 is four; however, the number of the plurality of projections 61 can be appropriately changed. For example, the light diffusivity of the second region 312 can be adjusted by increasing the number of the plurality of projections 61 so as to increase the light diffusivity or by decreasing the number of the plurality of projections 61 so as to decrease the light diffusivity. Further, if each of the projections 61 has an inclined surface with respect to the optical axis 20 of the lens 2, the angle of inclination of the inclined surface can be adjusted. In the present embodiment, the "inclined surface" refers to a surface including a flat surface or a curved surface having an inclination angle with respect to the optical axis 20 in a cross-sectional view of the cover member 3 along the optical axis 20 of the lens 2. Each of the projections 61 can have, for example, a Fresnel shape. Further, the lower surface 31d of the cover member 3 in the second region 312 can be provided with at least one spiral-shaped projection 61, and the at least one spiral-shaped projection 61 can surround the entire periphery of the first region 311 in a top view. The spiral-shaped projection 61 includes a curve that extends away from the center Q of the first region 311 as the spiral-shaped projection 61 turns in a top view. The spiral-shaped projection 61 has a sawtooth shape or a wave shape in a cross-sectional view along the Z axis and passing through the center Q of the first region 311. Even when the light-emitting module 100 has projections 61 on the lower surface 31d of the cover member 3 in the second region 312, the same effects as the case where the lower surface 31d of the cover member 3 in the second region 312 has a rough surface can be obtained.

Second Embodiment

Next, a light-emitting module according to a second embodiment will be described. The same names and reference numerals as those in the above-described embodiment refer to the same or equivalent members or components, and a detailed description thereof will be omitted as appropriate. The same applies to embodiments as will be described later.

Figure 8:
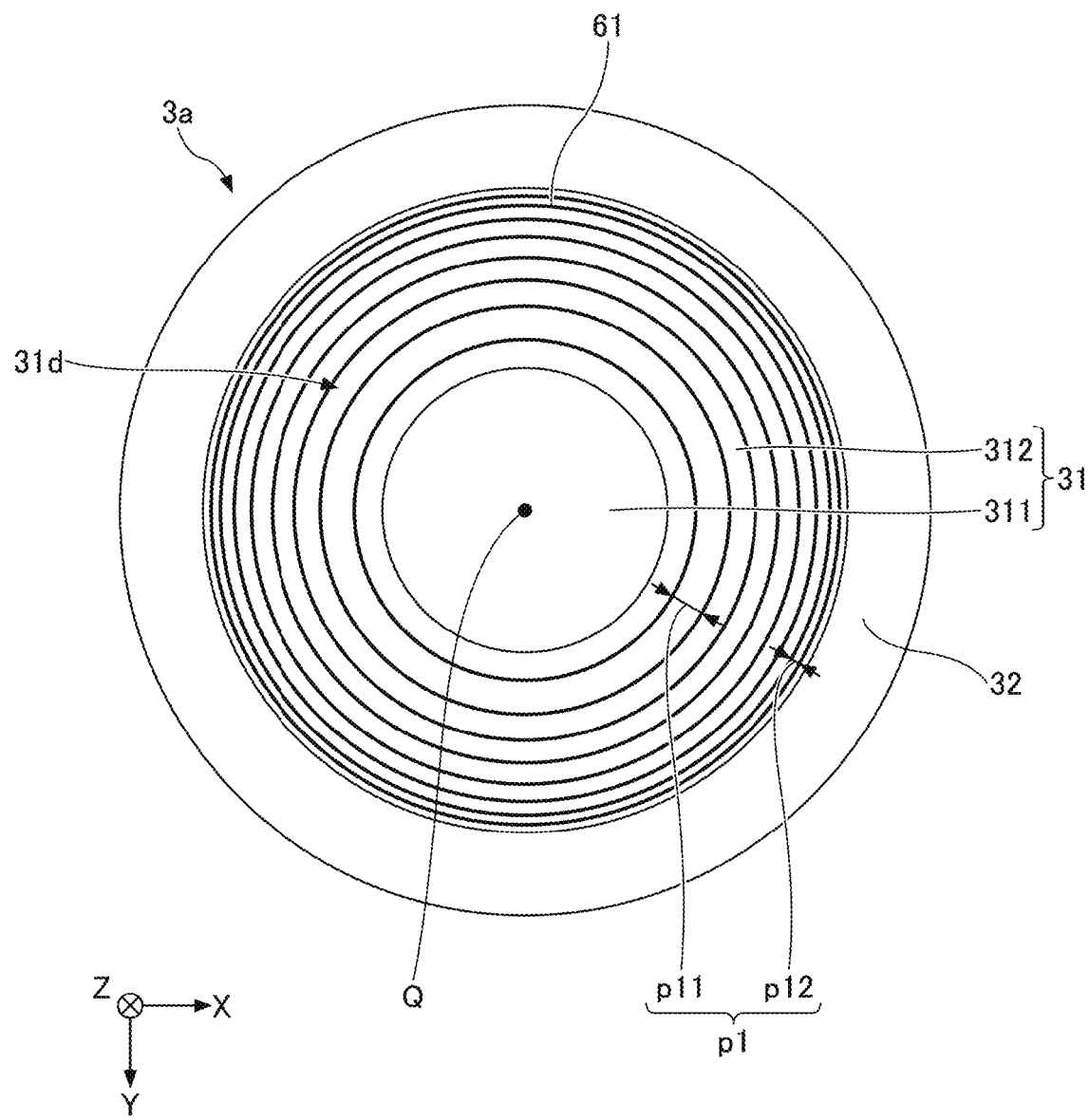
FIG. 8 is a schematic bottom view illustrating a first example of a cover member included in a light-emitting module according to a second embodiment.

FIG. 8 is a schematic bottom view illustrating a first example of a cover member 3a included in the light-emitting module according to the second embodiment.

The light-emitting module according to the second embodiment differs from the light-emitting module according to the first embodiment in that the light diffusivity of the second region 312 of the cover member 3a increases from the inner side toward the outer side of the second region 312 in a top view.

In the first example illustrated in FIG. 8, the lower surface 31d of the cover member 3a in the second region 312 is provided with a plurality of projections 61. The plurality of projections 61 are arranged concentrically around the center Q of the first region 311. A first interval p1 is an interval between adjacent projections 61 in the radial direction of the concentric circle. The first interval p1 between adjacent ones of the plurality of projections 61 gradually decreases from the inner side toward the outer side of the second region 312 in a top view. In the example illustrated in FIG. 8, the first interval p1 includes first intervals p11 and p12. The first interval p12 is located outward relative to the first interval p11 in a top view. The first interval p12 is smaller than the first interval p11. The first interval p1 gradually decreases from the inner side toward the outer side of the second region 312 in a top view, and thus the light diffusivity of the second region 312 of the cover member 3a gradually increases from the inner side toward the outer side of the second region 312.

In the light-emitting module according to the second embodiment, the light diffusivity of the second region 312 increases from the inner side toward the outer side of the second region 312 in a top view, and thus the boundary between the first region 311 and the second region 312 of the cover member 3a can be made vague (blurred). Accordingly, the aesthetic appearance of the cover member 3a can be improved, and the aesthetic appearance of the light-emitting module according to the second embodiment can be improved.

Further, for example, in a process of manufacturing the light-emitting module, if an error occurs in a component of the light-emitting module or a deviation occurs between the optical axis of the lens and the center of the light-emitting region, there can be a case where a portion of light contributing to partial irradiation passes through the second region close to the first region. In such a case, in the light-emitting module according to the second embodiment, the light diffusivity of the second region 312 close to the first region 311 is lower than the light diffusivity of the second region 312 far from the first region 311, and thus optical loss due to light diffusion can be reduced. In the first example illustrated in FIG. 8, the number of the plurality of projections 61 is eight; however, the number of the plurality of projections 61 can be appropriately changed.

Figure 9:
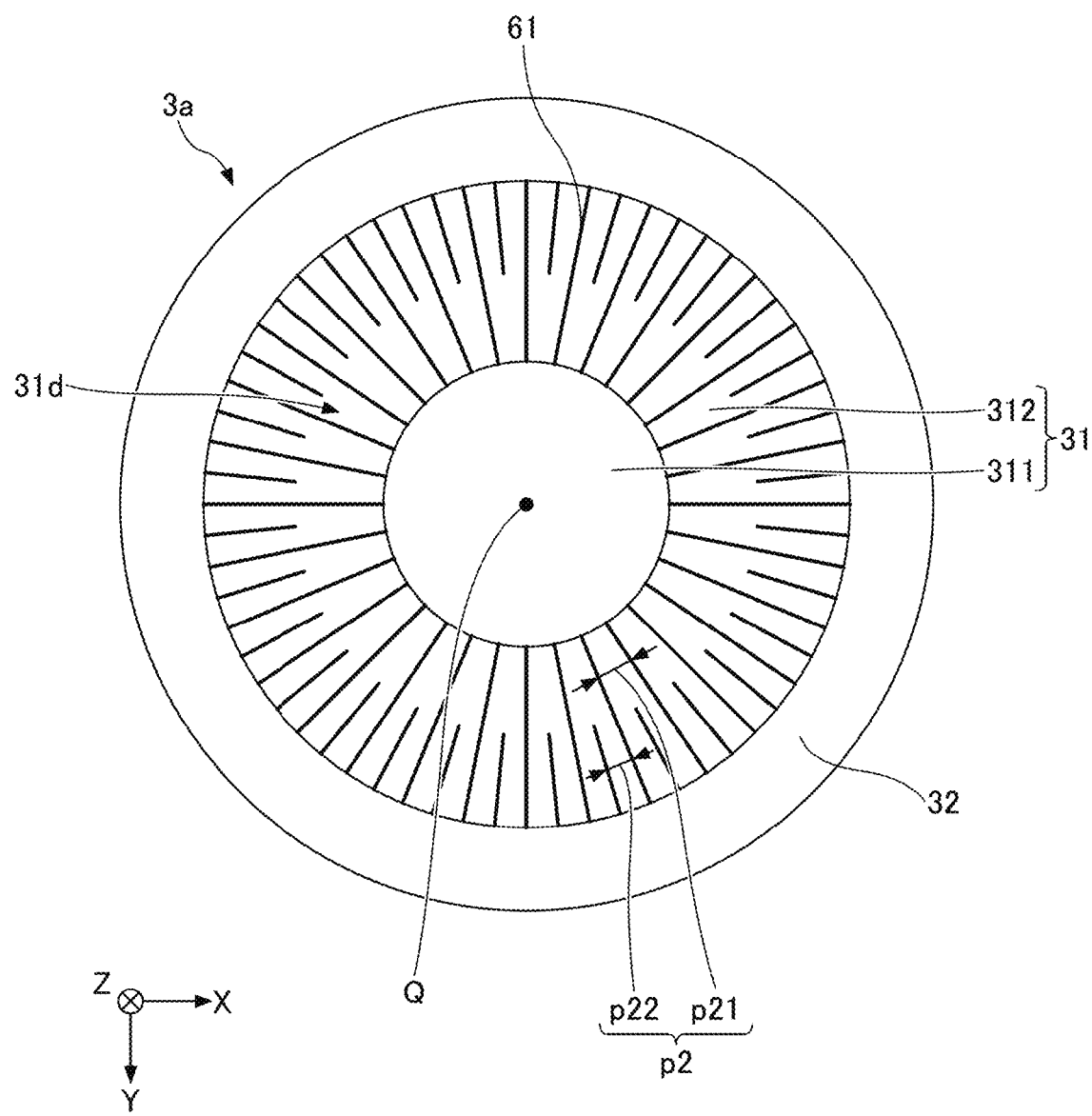
FIG. 9 is a schematic bottom view illustrating a second example of a cover member included in the light-emitting module according to the second embodiment.

FIG. 9 is a schematic bottom view illustrating a second example of a cover member 3a included in the light-emitting module according to the second embodiment.

The second example illustrated in FIG. 9 differs from the first example in that a plurality of projections 61 are arranged radially around the center Q of the first region 311. A second interval p2 is an interval between projections 61 adjacent to each other in the circumferential direction of the circular annular second region 312. The second interval p2 between adjacent ones of the plurality of projections 61 gradually decreases from the inner side toward the outer side of the second region 312 in a top view. In the example illustrated in FIG. 9, the second interval p2 includes second intervals p21 and p22. The second interval p22 is located outward relative to the second interval p21 in a top view. The second interval p22 is smaller than the second interval p21. The second interval p2 gradually decreases from the inner side toward the outer side of the second region 312 in a top view, and thus the light diffusivity of the second region 312 of the cover member 3a gradually increases from the inner side toward the outer side of the second region 312.

Even in the configuration of the second example in which the plurality of projections 61 are arranged radially around the center Q of the first region 311, the same effects as those of the first example can be obtained by increasing the light diffusivity of the second region 312 from the inner side toward the outer side of the second region 312 in a top view. The number of the plurality of projections 61 can be appropriately changed.

Further, in the light-emitting module according to the second embodiment, the light diffusivity of the second region 312 can be increased by increasing the surface roughness of a rough surface provided in the second region 312 from the inner side toward the outer side of the second region 312 of the cover member 3a in a top view.

Effects of the light-emitting module according to the second embodiment other than those described above are the same as those of the first embodiment.

Third Embodiment

Next, a light-emitting module according to a third embodiment will be described.

Example Configuration of Light-Emitting Module According to Third Embodiment

Figure 10:
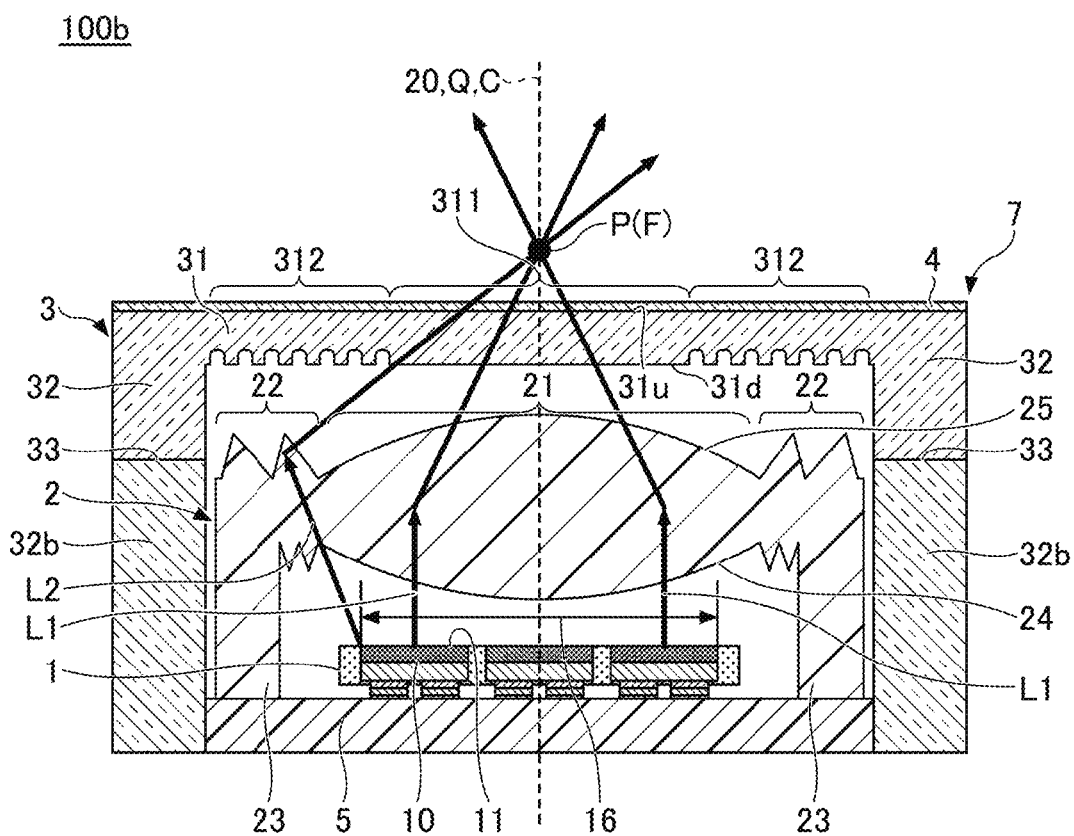
FIG. 10 is a schematic cross-sectional view illustrating an example of a light-emitting module according to a third embodiment.

FIG. 10 is a schematic cross-sectional view illustrating an example of a light-emitting module 100b according to the third embodiment. The top view of the light-emitting module 100b is the same as the top view of FIG. 1 except for the shape of a lens 2. FIG. 10 illustrates a schematic cross-sectional view of the light-emitting module 100b taken through a line corresponding to the line II-II of FIG. 1, and the same applies to cross-sectional views of FIG. 11 to FIG. 13 as will be described later.

The light-emitting module 100b further includes a support portion 32b that supports a cover member 3. The cover member 3 and the support portion 32b constitute a molded body by being directly bonded to each other at the interface therebetween. The cover member 3 has light transmissivity. The support portion 32b has a light shielding property. Further, in the light-emitting module 100b, an outer lens portion 22 has a plurality of concentric projections on a light incident surface that is the lower surface of the lens 2. The plurality of concentric projections are arranged around the optical axis 20 of the lens 2. The plurality of concentric projections provided on the light incident surface of the outer lens portion 22 have a sawtooth shape or a wave shape. The plurality of concentric projections can have, for example, a Fresnel shape. In the example illustrated in FIG. 10, a plurality of concentric projections provided on a light emission surface of the outer lens portion 22 overlap the plurality of concentric projections provided on the light incident surface of the outer lens portion 22 in a top view. The light-emitting module 100b differs from the light-emitting module according to the first embodiment in the above points. In the present embodiment, a molded body in which the cover member 3 and the support portion 32b are directly bonded to each other at the interface therebetween is, for example, a double molded body. The double molded body refers to a structure formed by a double-molding method. Further, a plurality of concentric projections can be provided on at least one of the light incident surface or the light emission surface of the outer lens portion 22.

In the example illustrated in FIG. 10, the support portion 32b is provided on the cover member 3 so as to extend downward from the lower surface of a support portion 32 of the cover member 3. The cover member 3 and the support portion 32b are connected to each other via a first boundary 33. The cover member 3 is composed of a resin material having light transmissivity. The support portion 32b is composed of a resin material containing a light reflective substance such as a white pigment or containing a light absorbing substance such as a black pigment. The support portion 32b is disposed on the lateral surface of the wiring substrate 5 via an adhesive member or the like, such that the lateral surface of the support portion 32b faces the lateral surface of the wiring substrate 5. The support portion 32b supports the cover member 3 such that the cover member 3 is disposed above the lens 2.

In the light-emitting module 100b, the cover member 3 and the support portion 32b are integrally formed as a molded body by being directly bonded to each other at the interface therebetween. Thus, the number of parts constituting the light-emitting module 100b can be reduced. Accordingly, while the configuration of the light-emitting module 100b can be simplified, the light-emitting module 100b can be easily manufactured. In addition, in the light-emitting module 100b, the cover member 3 having light transmissivity and the support portion 32b having a light shielding property constitute a molded body by being directly bonded to each other at the interface therebetween, and thus, external light entering the inside of the light-emitting module 100b through the support portion 32b can be reduced.

Effects of the light-emitting module 100b other than those described above are the same as those of the first embodiment.

Fourth Embodiment

Figure 11:
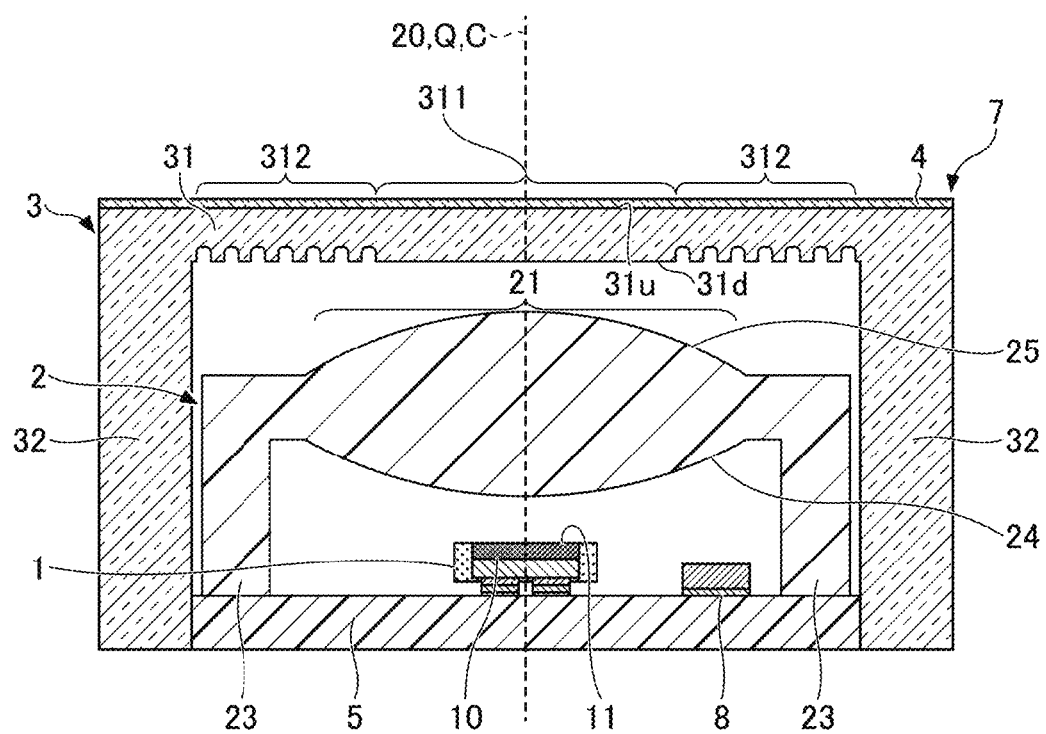
FIG. 11 is a schematic cross-sectional view illustrating an example of a light-emitting module according to a fourth embodiment.

Next, a light-emitting module according to a fourth embodiment will be described. FIG. 11 is a schematic cross-sectional view illustrating an example of a light-emitting module 100c according to the fourth embodiment.

The light-emitting module 100c differs from the light-emitting module according to the first embodiment in that a light source 1 includes one light-emitting part 10, a lens 2 does not include an outer lens portion outward of an effective portion 21, and the light-emitting module 100c includes an electronic component 8 such as a drive circuit of the light source 1, an electrostatic countermeasure element, a temperature sensor, or a photodiode.

In the example illustrated in FIG. 11, the electronic component 8 is disposed on the upper surface of the wiring substrate 5 and between the light source 1 and a leg portion 23. Further, the second region 312 and the electronic component 8 overlap each other in a top view. The cover member 3 includes the second region 312 and the electronic component 8 is disposed under the second region 312, and thus the electronic component 8 and the like disposed on the wiring substrate 5 are less likely to be visually recognized when the light-emitting module 100c is viewed from the +Z side of the upper surface 31u of the cover member 3. Accordingly, the aesthetic appearance of the light-emitting module 100c can be improved. Further, the light-emitting module 100c can obtain the effect of reducing stray light on the irradiation surface and the effect of irradiating a desired region with light.

Effects of the light-emitting module 100c other than those described above are the same as those of the first embodiment.

Fifth Embodiment

Figure 12:
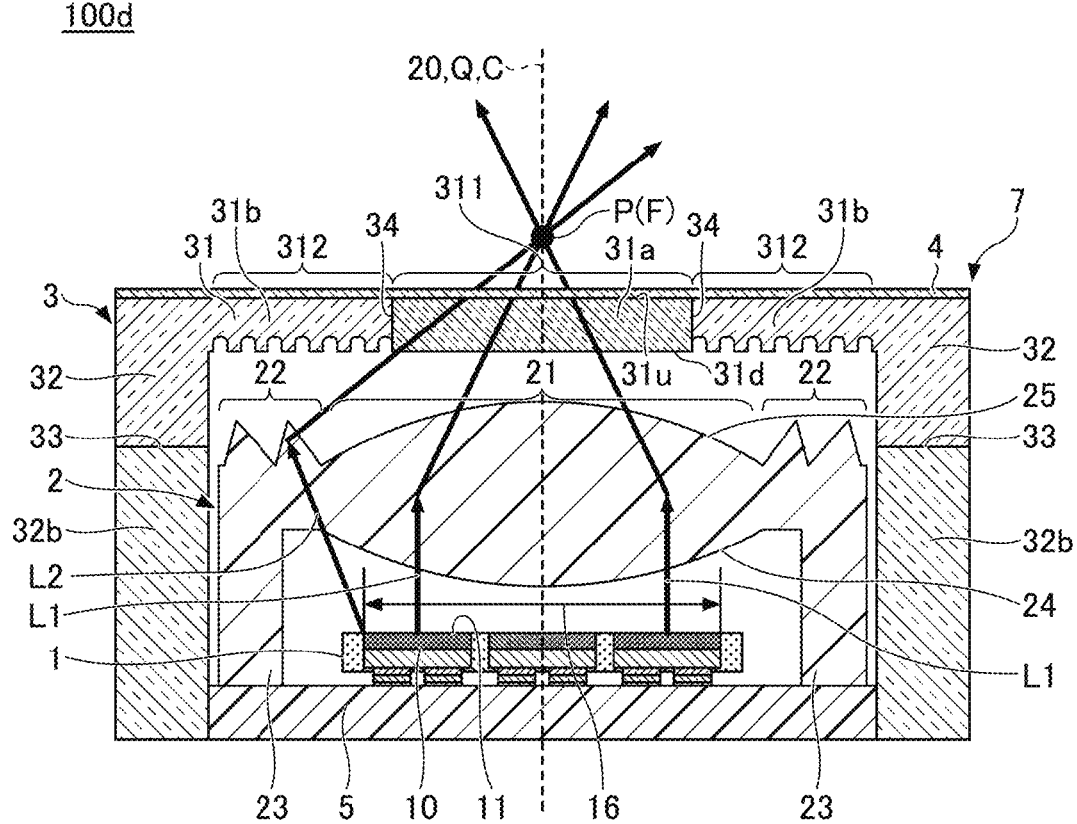
FIG. 12 is a schematic cross-sectional view illustrating an example of a light-emitting module according to a fifth embodiment.

Next, a light-emitting module according to a fifth embodiment will be described. FIG. 12 is a schematic cross-sectional view illustrating an example of a light-emitting module 100d according to the fifth embodiment.

The light-emitting module 100d further includes a support portion 32b that supports a cover member 3. In the light-emitting module 100d, the cover member 3 includes a first cover portion 31a and a second cover portion 31b. The first cover portion 31a includes a first region 311, and the second cover portion 31b is provided around the first cover portion 31a and includes a second region 312. The second cover portion 31b contacts the outer edge of the first cover portion 31a and surrounds the entire periphery of the first cover portion 31a. The first cover portion 31a and the second cover portion 31b constitute a molded body by being directly bonded to each other at the interface therebetween. The light-emitting module 100d further includes a support portion 32 provided around the second cover portion 31b. The support portion 32 surrounds the entire periphery of the second cover portion 31b. The support portion 32 extends downward from the outer edge of the second cover portion 31b. The support portion 32b is provided on the lower surface of the support portion 32 of the cover member 3. The support portion 32b is disposed on the lateral surface of the wiring substrate 5 via an adhesive member or the like, such that the lateral surface of the support portion 32b faces the lateral surface of the wiring substrate 5. The cover member 3, including the first cover portion 31a and the second cover portion 31b, and the support portion 32b constitute a molded body by being directly bonded to each other at the interface therebetween. The cover member 3 has light transmissivity. The support portion 32b has a light shielding property. The light-emitting module 100d differs from the light-emitting module according to the first embodiment in the above points. In the present embodiment, a molded body including the first cover portion 31a, the second cover portion 31b, and the support portion 32b, which are bonded to each other at the interfaces therebetween, is, for example, a triple-molded body. The triple-molded body refers to a structure formed by a triple-molding method.

In the example illustrated in FIG. 12, the support portion 32b is provided on the cover member 3 so as to extend downward from the lower surface of the support portion 32 of the cover member 3. The cover member 3 and the support portion 32b are connected to each other via a first boundary 33. The first cover portion 31a and the second cover portion 31b are connected to each other via a second boundary 34.

In the example illustrated in FIG. 12, the first region 311 includes a resin material or the like that has light transmissivity and that does not contain a light diffusing substance. The second region 312 includes a resin material or the like that has light transmissivity and that contains a light diffusing substance. The support portion 32b includes a resin material or the like containing a light reflective substance such as a white pigment or a light absorbing substance such as a black pigment. The support portion 32b is disposed on the lateral surface of the wiring substrate 5 via an adhesive member or the like. The support portion 32b supports the cover member 3 such that the cover member 3 is disposed above the lens 2.

In the light-emitting module 100d, the cover member 3, including the first cover portion 31a that includes the first region 311 and the second cover portion 31b that includes the second region 312, and the support portion 32b are integrally formed as a molded body by being directly bonded to each other at the interface therebetween, and thus the number of parts constituting the light-emitting module 100d can be reduced. Accordingly, while the configuration of the light-emitting module 100d can be simplified, the light-emitting module 100d can be easily manufactured. In addition, the light-emitting module 100d includes the support portion 32b having a light shielding property, and thus, external light entering the inside of the light-emitting module 100d through the support portion 32b can be reduced.

Effects of the light-emitting module 100d other than those described above are the same as those of the first embodiment.

Sixth Embodiment

Figure 13:
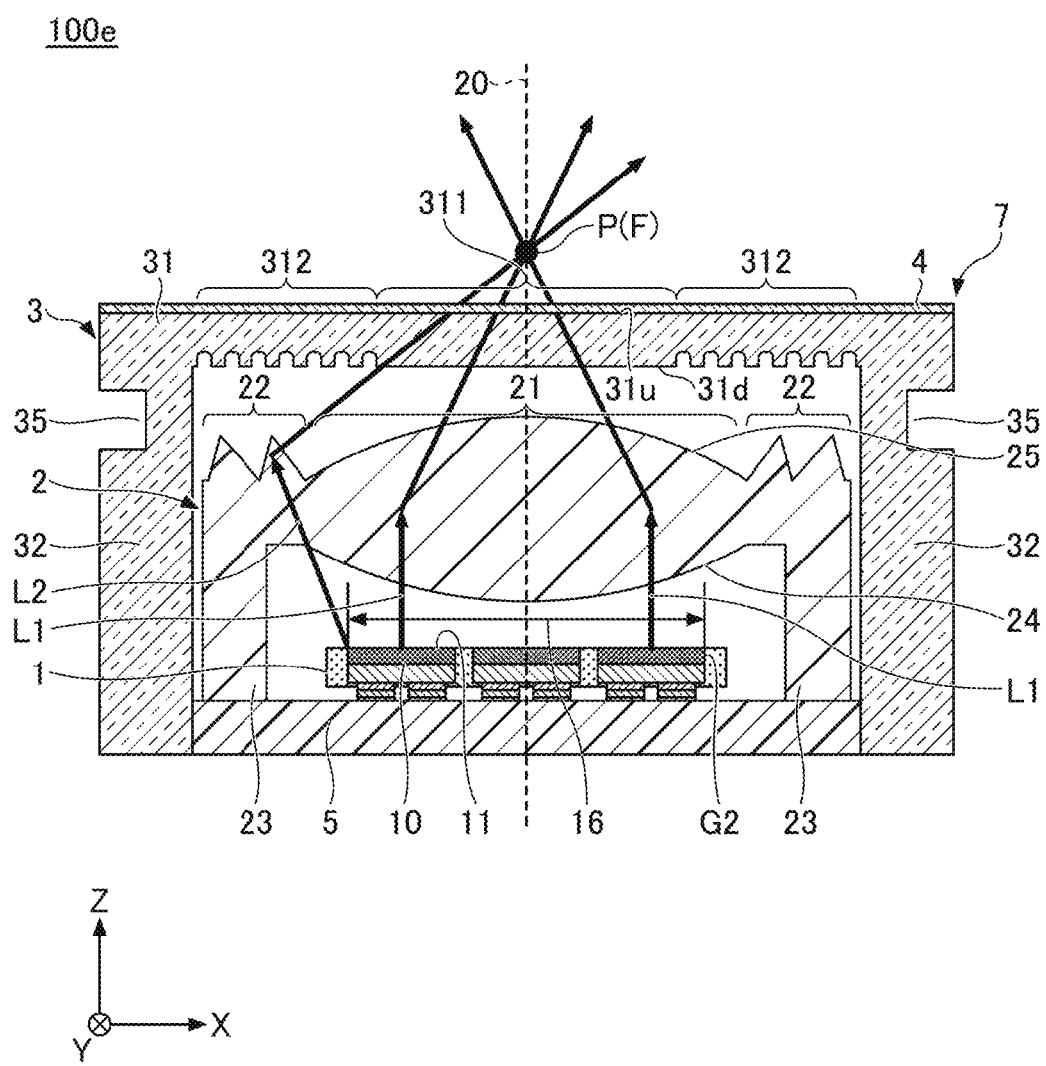
FIG. 13 is a schematic cross-sectional view illustrating an example of a light-emitting module according to a sixth embodiment.

Next, a light-emitting module according to a sixth embodiment will be described. FIG. 13 is a schematic cross-sectional view illustrating an example of a light-emitting module 100e according to the sixth embodiment.

The light-emitting module 100e differs from the light-emitting module according to the first embodiment in that a cover member 3 has a recess 35 in the outer lateral surface. The recess 35 is provided in the outer lateral surface of the support portion 32 of the cover member 3, and is formed in a groove shape that extends circumferentially around the support portion 32 in the circumferential direction.

The light-emitting module 100e can be attached to a smartphone by fitting a contact member configured to bring the light-emitting module 100e into close contact with a housing of the smartphone into the recess 35. The contact member is an annular member formed of an elastic material such as natural rubber or synthetic rubber. When the light-emitting module 100e is fixed to the housing of the smartphone with the contact member being fitted into the recess 35, a sealing effect of the contact member can suppress entry of dust, liquid, or the like into the inside of the smartphone from a gap between the light-emitting module 100e and the housing of the smartphone.

Effects of the light-emitting module 100e other than those described above are the same as those of the first embodiment.

Although embodiments have been described in detail above, the above-described embodiments are non-limiting examples, and various modifications and substitutions can be made to the above-described embodiments without departing from the scope described in the claims.

The numbers such as ordinal numbers and quantities used in the description of the embodiments are all provided as examples to specifically describe the technique of the present disclosure, and the present disclosure is not limited to the example numbers. In addition, the connection relationship between the components is illustrated for specifically describing the technique of the present disclosure, and the connection relationship for implementing the functions of the present disclosure is not limited thereto.

The light-emitting modules according to the present disclosure can reduce stray light on an irradiation surface. Therefore, the light-emitting modules according to the present disclosure can be suitably used for lighting, camera flashes, vehicle headlights, and the like. However, the application of the light-emitting modules according to the present disclosure is not limited to these applications.

According to one embodiment of the present disclosure, a light-emitting module and cover structure, in which stray light on an irradiation surface is reduced, can be provided.

The invention claimed is:

1. A light-emitting module comprising:
a light source;
a lens located over the light source and configured to transmit light from the light source; and
a cover member located over the lens and having a lower surface on which the light is to be incident and an upper surface from which the light is to be emitted, wherein the lower surface of the cover member comprises:
a first region on which the light from the light source after being transmitted through the lens is to be incident, and
a second region located around the first region, wherein a light diffusivity of the second region is higher than a light diffusivity of the first region, and wherein the light diffusivity of the second region increases from an inner side toward an outer side of the second region in a top view; and
a light-transmissive member covering the upper surface of the cover member and having a higher hardness than a hardness of the cover member.

2. The light-emitting module according to claim 1, wherein the lower surface of the cover member in the second region comprises at least one of a roughened surface or one or more projections.

3. The light-emitting module according to claim 1, wherein the lower surface of the cover member in the second region comprises a plurality of projections arranged concentrically or radially.

4. The light-emitting module according to claim 1, further comprising:
a support portion that supports the cover member, wherein:
the cover member and the support portion are directly bonded to each other at an interface therebetween and constitute a molded body,
the cover member has light transmissivity, and
the support portion has a light shielding property.

5. The light-emitting module according to claim 1, wherein:
the cover member comprises:
a first cover portion comprising the first region, and
a second cover portion located around the first cover portion and comprising the second region, and
the first cover portion and the second cover portion are directly bonded to each other at an interface therebetween and constitute a molded body.

6. The light-emitting module according to claim 1, wherein a light diffusing substance is disposed on the lower surface of the cover member in the second region.

7. The light-emitting module according to claim 1, wherein a portion of the cover member that overlaps the second region in a top view contains a light diffusing substance.

8. The light-emitting module according to claim 1, wherein the lens comprises a convex lens.

9. The light-emitting module according to claim 1, wherein:
the lens comprises an outer lens portion having a plurality of concentric projections on at least one of a light incident surface or a light emission surface thereof, and
the outer lens portion overlaps the second region in a top view.

10. The light-emitting module according to claim 1, wherein the cover member has a recess in an outer lateral surface thereof.

11. The light-emitting module according to claim 1, wherein:
the light source comprises a plurality of light-emitting parts, and
light from a light emitting part of the plurality of light-emitting parts, after being transmitted through the lens, is emitted to a region located opposite a position of the light emitting part of the plurality of light-emitting parts with respect to a point on an optical axis of the lens.

12. The light-emitting module according to claim 1, wherein:
the light source comprises at least one light-emitting part, which comprises a light-emitting element, a wavelength conversion member disposed above the light-emitting element, and a light-shielding member covering a lateral surface of the light-emitting element and a lateral surface of the wavelength conversion member.

13. The light-emitting module according to claim 1, wherein:
the light source comprises a plurality of light-emitting parts, each light-emitting part comprising a light-emitting element, and a wavelength conversion member disposed above the light-emitting element, and
the light-emitting module further comprises a light-shielding member that integrally holds the light-emitting elements and the wavelength conversion members and covers lateral surfaces of the light-emitting elements and lateral surfaces of the wavelength conversion members.

14. The light-emitting module according to claim 1, wherein:
the light source comprises a light-emitting region comprising at least one light-emitting surface, and
a maximum width W of the first region in a direction along the lower surface of the cover member is represented by a formula:

$$W \geq 2 \times D \times d/f,$$

where f is a focal length of the lens, d is a shortest distance from a focal point of the lens to the lower surface of the cover member on an optical axis of the lens, and D is a longest distance from a center of the light emitting region to an outer edge of the light emitting region in a direction along the light emitting surface.

15. The light-emitting module according to claim 14, wherein the lower surface of the cover member in the second region comprises at least one of a roughened surface or one or more projections.

16. A cover structure comprising:
a lens; and
a cover member disposed over the lens and having a lower surface and an upper surface, wherein:
the lower surface of the cover member comprises
a first region, and
a second region located around the first region, wherein a light diffusivity of the second region is higher than a light diffusivity of the first region, and wherein the light diffusivity of the second region increases from an inner side toward an outer side of the second region in a top view, and
the upper surface of the cover member is covered by a light-transmissive member, wherein a hardness of the light-transmissive member is higher than a hardness of the cover member.

17. The cover structure according to claim 16, wherein the lower surface of the cover member in the second region comprises at least one of a roughened surface or one or more projections.

18. The cover structure according to claim 14, wherein the lower surface of the cover member in the second region comprises a plurality of projections arranged concentrically or radially.

19. The cover structure according to claim 16, wherein a light diffusing substance is disposed on the lower surface of the cover member in the second region.

20. The light-emitting module according to claim 16, wherein a portion of the cover member that overlaps the second region in a top view contains a light diffusing substance.

21. A light-emitting module comprising:
a light source;
a lens located over the light source and configured to transmit light from the light source; and
a cover member located over the lens and having a lower surface on which the light is to be incident and an upper surface from which the light is to be emitted, wherein the lower surface of the cover member comprises:
a first region on which the light from the light source after being transmitted through the lens is to be incident, and
a second region located around the first region, wherein a light diffusivity of the second region is higher than a light diffusivity of the first region; and
a light-transmissive member covering the upper surface of the cover member and having a higher hardness than a hardness of the cover member; wherein:
the light source comprises a light-emitting region comprising at least one light-emitting surface, and
a maximum width W of the first region in a direction along the lower surface of the cover member is represented by a formula:

$$W \geq 2 \times D \times d/f,$$

where f is a focal length of the lens, d is a shortest distance from a focal point of the lens to the lower surface of the cover member on an optical axis of the lens, and D is a longest distance from a center of the light emitting region to an outer edge of the light emitting region in a direction along the light emitting surface.

* * * * *